US009801188B2

(12) United States Patent
Khandekar et al.

(10) Patent No.: US 9,801,188 B2
(45) Date of Patent: Oct. 24, 2017

(54) BACKHAUL SIGNALING FOR INTERFERENCE AVOIDANCE

(75) Inventors: Aamod Khandekar, San Diego, CA (US); Avneesh Agrawal, San Diego, CA (US); Ashwin Sampath, Skillman, NJ (US); Gavin B. Horn, La Jolla, CA (US); Alexei Gorokhov, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 12/260,849

(22) Filed: Oct. 29, 2008

(65) Prior Publication Data

US 2009/0197588 A1    Aug. 6, 2009

Related U.S. Application Data

(60) Provisional application No. 61/025,670, filed on Feb. 1, 2008, provisional application No. 61/047,021, filed on Apr. 22, 2008.

(51) Int. Cl.
*H04W 4/00* (2009.01)
*H04W 72/08* (2009.01)
(Continued)

(52) U.S. Cl.
CPC ........ *H04W 72/082* (2013.01); *H04W 52/243* (2013.01); *H04W 72/0426* (2013.01);
(Continued)

(58) Field of Classification Search
CPC . H04W 52/325; H04W 72/082; H04W 52/08; H04W 52/146; H04W 24/10;
(Continued)

(56) References Cited

U.S. PATENT DOCUMENTS 5,313,461 A    5/1994 Ahl et al.
5,625,628 A    4/1997 Heath
(Continued)

FOREIGN PATENT DOCUMENTS

CN    1322419 A    11/2001
CN    1436434 A    8/2003
(Continued)

OTHER PUBLICATIONS

KAIST: "Spread Spectrum Systems", Fall semester 2000, pp. 1-37.
(Continued)

*Primary Examiner* — Charles Appiah
*Assistant Examiner* — Edward Zhang
(74) *Attorney, Agent, or Firm* — Paul Kuo

(57) ABSTRACT

Providing for interference reduction and/or avoidance utilizing backhaul signaling between wireless access points (APs) of a wireless access network (AN) is described herein. By way of example, an interference avoidance request (IAR) can be issued by an AP to reduce signal interference on forward link (FL) and/or downlink (DL) transmissions by neighboring APs. The IAR can be routed via a backhaul network and/or over-the-air via access terminals (ATs) coupled with the AP or one or more interfering APs. Upon receiving the IAR, an interfering AP can determine reduced transmit power levels for FL and/or RL transmissions and respond to the IAR. The response can include reduced power levels and can be sent via the backhaul network or OTA. By employing the backhaul network in full or in part, interference avoidance can be conducted even for semi-planned or unplanned heterogeneous networks coupled by the backhaul.

36 Claims, 14 Drawing Sheets

(51) Int. Cl.
  *H04W 52/24* (2009.01)
  *H04W 72/04* (2009.01)
  *H04W 84/04* (2009.01)
  *H04W 92/20* (2009.01)

(52) U.S. Cl.
  CPC .......... *H04W 84/045* (2013.01); *H04W 92/20* (2013.01); *Y02B 60/50* (2013.01)

(58) Field of Classification Search
  CPC ... H04W 36/06; H04W 52/04; H04W 52/243; H04W 72/0453; H04L 1/1858
  USPC ............. 455/63.1–63.4, 522, 525, 67.13, 69, 455/278.11, 296, 447; 370/332, 329, 334, 370/328, 318, 311, 331
  See application file for complete search history.

(56) References Cited

U.S. PATENT DOCUMENTS

| | | |
|---|---|---|
| 5,822,696 A | 10/1998 | Bergkvist |
| 5,953,323 A | 9/1999 | Haartsen |
| 5,953,665 A | 9/1999 | Mattila |
| 6,052,594 A | 4/2000 | Chuang et al. |
| 6,134,231 A | 10/2000 | Wright |
| 6,285,886 B1* | 9/2001 | Kamel et al. ............... 455/522 |
| 6,351,643 B1 | 2/2002 | Haartsen |
| 6,393,295 B1 | 5/2002 | Butler et al. |
| 6,483,826 B1 | 11/2002 | Åkerberg |
| 6,522,628 B1 | 2/2003 | Patel et al. |
| 6,556,582 B1 | 4/2003 | Redi |
| 6,577,608 B1 | 6/2003 | Moon et al. |
| 6,633,762 B1 | 10/2003 | Rauscher |
| 6,724,815 B1* | 4/2004 | Jepsen et al. ............... 375/225 |
| 6,728,217 B1* | 4/2004 | Amirijoo et al. ........... 370/252 |
| 6,760,328 B1 | 7/2004 | Ofek |
| 6,882,847 B2 | 4/2005 | Craig et al. |
| 6,901,060 B1 | 5/2005 | Lintulampi |
| 6,973,326 B2 | 12/2005 | Noh |
| 7,042,856 B2 | 5/2006 | Walton et al. |
| 7,072,313 B2 | 7/2006 | Kronz |
| 7,145,890 B1 | 12/2006 | Seo et al. |
| 7,158,503 B1 | 1/2007 | Kalliojarvi et al. |
| 7,356,049 B1* | 4/2008 | Rezvani ...................... 370/484 |
| 7,383,057 B1 | 6/2008 | Senarath et al. |
| 7,400,642 B2* | 7/2008 | Koo et al. ................... 370/447 |
| 7,474,643 B2 | 1/2009 | Malladi et al. |
| 7,499,438 B2 | 3/2009 | Hinman et al. |
| 7,640,013 B2 | 12/2009 | Okita et al. |
| 7,966,033 B2 | 6/2011 | Borran et al. |
| 7,983,298 B2 | 7/2011 | Nanda et al. |
| 2001/0053140 A1 | 12/2001 | Choi et al. |
| 2002/0001299 A1 | 1/2002 | Petch et al. |
| 2002/0012332 A1* | 1/2002 | Tiedemann et al. ......... 370/335 |
| 2002/0028675 A1* | 3/2002 | Schmutz et al. ............. 455/424 |
| 2002/0034158 A1 | 3/2002 | Wang et al. |
| 2002/0172208 A1 | 11/2002 | Malkamaki |
| 2002/0181436 A1* | 12/2002 | Mueckenheim et al. ..... 370/349 |
| 2002/0187804 A1 | 12/2002 | Narasimha et al. |
| 2003/0123425 A1* | 7/2003 | Walton et al. ............... 370/341 |
| 2003/0130002 A1 | 7/2003 | Chen et al. |
| 2003/0134655 A1* | 7/2003 | Chen et al. .................. 455/522 |
| 2003/0227889 A1 | 12/2003 | Wu et al. |
| 2004/0203828 A1* | 10/2004 | Mirchandani et al. ..... 455/452.1 |
| 2004/0240402 A1 | 12/2004 | Stephens |
| 2004/0266339 A1 | 12/2004 | Larsson |
| 2005/0002410 A1 | 1/2005 | Chao et al. |
| 2005/0003796 A1 | 1/2005 | Kashiwase |
| 2005/0068902 A1 | 3/2005 | Rath |
| 2005/0079865 A1 | 4/2005 | Ahn et al. |
| 2005/0197071 A1 | 9/2005 | Yoshida et al. |
| 2005/0201325 A1 | 9/2005 | Kang et al. |
| 2005/0281316 A1 | 12/2005 | Jang et al. |
| 2006/0019701 A1 | 1/2006 | Ji |
| 2006/0084459 A1* | 4/2006 | Phan et al. .................. 455/522 |
| 2006/0114877 A1* | 6/2006 | Heo et al. .................... 370/342 |
| 2006/0133381 A1 | 6/2006 | Wang |
| 2006/0153122 A1 | 7/2006 | Hinman et al. |
| 2006/0172716 A1 | 8/2006 | Yoshii et al. |
| 2006/0211441 A1 | 9/2006 | Mese et al. |
| 2006/0215559 A1 | 9/2006 | Mese et al. |
| 2006/0217142 A1* | 9/2006 | Inaba ................... H04W 52/143 455/522 |
| 2006/0246936 A1* | 11/2006 | Gross et al. ................. 455/522 |
| 2006/0251006 A1 | 11/2006 | Oliver et al. |
| 2006/0285522 A1 | 12/2006 | Kim et al. |
| 2006/0286996 A1 | 12/2006 | Julian et al. |
| 2007/0002958 A1 | 1/2007 | Chang et al. |
| 2007/0041429 A1* | 2/2007 | Khandekar .................. 375/146 |
| 2007/0060057 A1* | 3/2007 | Matsuo ................ H04B 1/0475 455/63.1 |
| 2007/0064666 A1* | 3/2007 | Kwun et al. ................. 370/343 |
| 2007/0082619 A1* | 4/2007 | Zhang et al. .................. 455/69 |
| 2007/0097897 A1 | 5/2007 | Teague et al. |
| 2007/0105574 A1 | 5/2007 | Gupta et al. |
| 2007/0105576 A1 | 5/2007 | Gupta et al. |
| 2007/0115817 A1 | 5/2007 | Gupta et al. |
| 2007/0135125 A1 | 6/2007 | Kim et al. |
| 2007/0140168 A1 | 6/2007 | Laroia et al. |
| 2007/0161389 A1 | 7/2007 | Khandekar |
| 2007/0165575 A1* | 7/2007 | Niwano ....................... 370/335 |
| 2007/0168326 A1 | 7/2007 | Das et al. |
| 2007/0173256 A1* | 7/2007 | Laroia et al. ................ 455/436 |
| 2007/0217352 A1 | 9/2007 | Kwon |
| 2007/0253355 A1 | 11/2007 | Hande et al. |
| 2007/0280170 A1* | 12/2007 | Kawasaki .................... 370/331 |
| 2008/0039089 A1 | 2/2008 | Berkman et al. |
| 2008/0039133 A1 | 2/2008 | Ma et al. |
| 2008/0057934 A1 | 3/2008 | Sung et al. |
| 2008/0062925 A1* | 3/2008 | Mate et al. .................. 370/331 |
| 2008/0069028 A1 | 3/2008 | Richardson |
| 2008/0101301 A1 | 5/2008 | Thomas et al. |
| 2008/0102822 A1* | 5/2008 | Feng et al. ................... 455/425 |
| 2008/0130586 A1 | 6/2008 | Johnson et al. |
| 2008/0144577 A1 | 6/2008 | Huang et al. |
| 2008/0167075 A1 | 7/2008 | Kurtz et al. |
| 2008/0253355 A1 | 10/2008 | Tominaga et al. |
| 2009/0023477 A1 | 1/2009 | Staudte |
| 2009/0061871 A1 | 3/2009 | Gross et al. |
| 2009/0070694 A1 | 3/2009 | Ore et al. |
| 2009/0092178 A1 | 4/2009 | Sayana et al. |
| 2009/0129333 A1 | 5/2009 | Khandekar et al. |
| 2009/0129350 A1 | 5/2009 | Khandekar et al. |
| 2009/0131098 A1 | 5/2009 | Khandekar et al. |
| 2009/0135761 A1 | 5/2009 | Khandekar et al. |
| 2009/0203385 A1 | 8/2009 | Khandekar et al. |
| 2010/0260163 A1 | 10/2010 | Machida |
| 2014/0078992 A1 | 3/2014 | Khandekar et al. |

FOREIGN PATENT DOCUMENTS

| | | |
|---|---|---|
| CN | 1518838 A | 8/2004 |
| CN | 1653845 A | 8/2005 |
| CN | 1795645 A | 6/2006 |
| CN | 101043640 A | 9/2007 |
| EP | 1699199 A1 | 9/2006 |
| EP | 2217011 A1 | 8/2010 |
| FR | 2854009 A1 | 10/2004 |
| GB | 2353189 A | 2/2001 |
| JP | H08505033 A | 5/1996 |
| JP | 11252114 A | 9/1999 |
| JP | 2001028779 A | 1/2001 |
| JP | 2002111627 | 4/2002 |
| JP | 2002217819 A | 8/2002 |
| JP | 2002232353 A | 8/2002 |
| JP | 2002335557 A | 11/2002 |
| JP | 2004207983 A | 7/2004 |
| JP | 2005210703 A | 8/2005 |
| JP | 2005244906 A | 9/2005 |
| JP | 2007006503 A | 1/2007 |
| JP | 2007514445 A | 6/2007 |
| JP | 2007521694 A | 8/2007 |
| JP | 2007295356 A | 11/2007 |
| JP | 2008510437 A | 4/2008 |

(56) References Cited

FOREIGN PATENT DOCUMENTS

| | | |
|---|---|---|
| JP | 2008278264 A | 11/2008 |
| JP | 2009510970 A | 3/2009 |
| JP | 2009521825 A | 6/2009 |
| JP | 2010534099 A | 11/2010 |
| JP | 4941563 B2 | 5/2012 |
| KR | 100260457 B1 | 7/2000 |
| KR | 100765892 B1 | 10/2007 |
| RU | 2108673 | 4/1998 |
| RU | 2148891 C1 | 5/2000 |
| RU | 2183909 C2 | 6/2002 |
| RU | 2197779 C2 | 1/2003 |
| RU | 2004119813 A | 12/2005 |
| RU | 2276464 C2 | 5/2006 |
| WO | WO1994016513 A1 | 7/1994 |
| WO | 9511559 A1 | 4/1995 |
| WO | 9833339 A2 | 7/1998 |
| WO | 9839940 | 9/1998 |
| WO | WO9908464 A1 | 2/1999 |
| WO | 0010336 A2 | 2/2000 |
| WO | 00048525 | 8/2000 |
| WO | 0070786 A1 | 11/2000 |
| WO | WO01065749 | 9/2001 |
| WO | WO0176098 A2 | 10/2001 |
| WO | 2002091597 | 11/2002 |
| WO | 03028245 A1 | 4/2003 |
| WO | WO04006467 | 1/2004 |
| WO | 2005006586 A2 | 1/2005 |
| WO | 05036914 | 4/2005 |
| WO | 2005043866 A1 | 5/2005 |
| WO | 2005059111 A2 | 6/2005 |
| WO | WO05101888 | 10/2005 |
| WO | WO05109705 | 11/2005 |
| WO | 2006023536 A2 | 3/2006 |
| WO | 06096421 | 9/2006 |
| WO | 07022631 | 3/2007 |
| WO | WO07024896 | 3/2007 |
| WO | 2007040450 A1 | 4/2007 |
| WO | 2007043096 A1 | 4/2007 |
| WO | WO2007044281 | 4/2007 |
| WO | 07051162 | 5/2007 |
| WO | 2007069848 A2 | 6/2007 |
| WO | WO07078177 | 7/2007 |
| WO | WO2007078199 A1 | 7/2007 |
| WO | WO07092771 | 8/2007 |
| WO | 07114966 | 10/2007 |
| WO | 07123519 | 11/2007 |
| WO | WO08113966 | 9/2008 |
| WO | 2009054058 A1 | 4/2009 |
| WO | 2009064648 A1 | 5/2009 |

OTHER PUBLICATIONS

Marc C. et al., "Coordinated Fractional Frequency Reuse", MSWiM'07, Oct. 22-26, 2007, pp. 296-305.

Chen S. L., et al., "Capacity improvement in cellular systems with dynamic channel assignment and reuse partitioning" Personal, Indoor and Mobile Radio Communications, 2003. PIMRC 2003. 14th IEEE Proceedings on Sep. 7-10, 2003, IEEE, Piscataway, NJ, USA, vol. 2, Sep. 7, 2003 (Sep. 7, 2003), pp. 1441-1445, XP010679303.

Cruz-Perez, et al., "Frequency reuse and distributed dynamic channel assignment in microcellular systems" IEEE International Symposium on Personal, Indoor and Mobile Radio Communications, Sep. 1, 1997 (Sep. 1, 1997), pp. 415-419, XP010247680.

Dae N. B., et al., "Channel state-aware joint dynamic cell coordination scheme using adaptive modulation and variable reuse factor in OFDMA downlink" Telecommunication Systems, vol. 36, No. 1-3, Dec. 4, 2007 (Dec. 4, 2007), pp. 85-96, XP019581250.

Elayoub, et al., "Performance evaluation of frequency planning schemes in OFDMA-based networks" IEEE Transactions on Wireless Communications, vol. 7, No. 5, May 2008 (May 2008), pp. 1623-1633, XP011215006.

Halpern, "Reuse partitioning in cellular systems" IEEE Vehicular Technology Conference, Jan. 1983 (Jan. 1983), pp. 322-327, XP002096008.

International Search Report and Written Opinion—PCT/US2008/083043, International Search Authority—European Patent Office—Jul. 30, 2009.

Jia, et al., "On the Performance of IEEE 802.16 OFDMA System Under Different Frequency Reuse and Subcarrier Permutation Patterns" IEEE International Conference on Communications, Jun. 2007 (Jun. 2007), pp. 5720-5725, XP031126581.

Johansso, "Dynamic Reuse Partitioning Within Cells Based on Local Channel and Arrival Rate Fluctuations" IEEE Transactions on Vehicular Technology, vol. 57, No. 2, Mar. 2008 (Mar. 2008), pp. 1155-1165, XP011201845.

Kataoka, et al., "Channel information assisted reuse partitioning—a distributed dynamic channel assignment algorithm based on reuse partitioning" International Conference on Universal Personal Communications, Sep. 27, 1994 (Sep. 27, 1994), pp. 536-540, XP010131611.

Kiani, et al., "Maximizing Multicell Capacity Using Distributed Power Allocation and Scheduling" IEEE Wireless Communications and Networking Conference, Mar. 11, 2007 (Mar. 11, 2007), pp. 1692-1696, XP031097456.

Klerer: "802.20 harmonized draft editing group version" IEEE P802.20-D3.0, Apr. 3, 2007 (Apr. 3, 2007), pp. 1-1 149, XP040393818 Piscataway, US.

Michael Wang, et al., "Preamble Design in Ultra Mobile Broadband Communication Systems" IEEE International Workshop on Signal Design and Its Applications in Communications, Sep. 23, 2007 (Sep. 23, 2007), pp. 328-333, XP031194263.

Mitsubishi Electric, "Combined fixed and adaptive soft-frequency reuse for inter-cell interference coordination" 3GPP Draft R1-083615, Sep. 28, 2008 (Sep. 28, 2008), XP050316974 Sophia-Antipolis, FR [retrieved on Sep. 23, 2008].

Neung-Hyung Lee, et al., "Channel allocation considering the interference range in multi-cell OFDMA downlink systems" Communication Systems Software and Middleware, 2007. COMSWARE 2007. 2N D International Conference on, IEEE, PI, Jan. 2007 (Jan. 2007), pp. 1-6, XP031113903.

Onoe, et al., "Flexible re-use for dynamic channel assignment in mobile radio systems" International Conference on Communications, Jun. 11, 1989 (Jun. 11, 1989), pp. 472-476, X0010081098.

Qualcomm Europe: "Description and simulations of interference management" 3GPP Draft R1-050896, Aug. 24, 2005 (Aug. 24, 2005), XP050100516 Sophia-Antipolis, FR.

Rahman, et al., "Interference Avoidance through Dynamic Downlink OFDMA Subchannel Allocation using Intercell Coordination" IEEE Vehicular Technology Conference, May 11, 2008 (May 11, 2008), pp. 1630-1635, XP031255841.

Seok H. W., et al., "Inter-Cell Interference Coordination/Avoidance for Frequency Reuse by Resource Scheduling in an QFDM-Based Cellular System" IEEE Vehicular Technology Conference, Sep. 1, 2007 (Sep. 1, 2007), pp. 1722-1725, XP031147702.

Steven L. C., et al., "Dynamic Channel Assignment with Flexible Reuse Partitioning in Cellular Systems" Wireless Personal Communications, vol. 42, No. 2, Aug. 16, 2006 (Aug. 16, 2006), pp. 161-183, XP019509800.

Stolyar, et al., "Self-Organizing Dynamic Fractional Frequency Reuse in OFDMA Systems" IEEE Conference on Computer Communications, Apr. 13, 2008 (Apr. 13, 2008), pp. 691-699, XP031263869.

Wang, et al., "Interference Management and Handoff Techniques in Ultra Mobile Broadband Communication Systems" IEEE International Symposium Onspread Spectrum Techniques and Applications, Aug. 25, 2008 (Aug. 25, 2008), pp. 166-172, XP031319003.

Young-June Coi., et al., "Flexible Design of Frequency Reuse Factor in OFDMA Cellular Networks" IEEE International Conference on Communications, Jun. 2006 (Jun. 2006), pp. 1784-1788, XP031025320.

Jette, et al., "UMBFDD Draft Technology Overview, IEEE C802.20-07/09", IEEE 802.20 Working on Group Mobile Broadband Wireless Access, Mar. 5, 2007, pp. 1-34.

(56) References Cited

OTHER PUBLICATIONS

Qualcomm Europe, "Restricted Association for HNBs," 3GPP Draft, TSG-RAN WG2 #59bis, Jeju, China, R2-075125, Nov. 12, 2007, pp. 1-6.

Wang M, "Preamble Design in Ultra Mobile Broadband Communication Systems, Signal Design and Its Applications in Communications," 2007. IWSDA 2007. 3rd International Workshop on, Sep. 23, 2007, URL: http://ieeexplore.ieee.org/stamp/stamp.jsp?tp=&arnumber=4408390UMBFDD Draft Technology Overview, IEEE C802.20-07/09, Mar. 11, 2007, pp. 4-11, URL : http://grouperieee.org/groups/802/20/Contribs/C802.20-07-09.pdf.

Huawei: "Control channel design in frequency domain", 3GPP R1-061402, May 12, 2006.

Qualcomm Europe: "DL PHY channels: Channel multiplexing", 3GPP R1-060462, Feb. 17, 2006.

Airvana: "Tutorial on Femtocell Technology and SIP/IMS-based Femto Network Architectures", 3GPP2 Femto Workshop, Oct. 15, 2007, 68 pages.

Lee A., et al., "Integrating Femto-cell into the cdma2000 1xRTT and EV-DO and the UMB Environments", 3GPP2 Femto Workshop, Oct. 2006, 21 pages.

\* cited by examiner

BACKHAUL SIGNALING FOR INTERFERENCE AVOIDANCE

CLAIM OF PRIORITY UNDER 35 U.S.C. §119

The present Application for Patent claims priority to:

Provisional Application No. 61/025,670 entitled AIR-INTERFERENCE AND BACKHAUL SIGNALING APPROACHES FOR INTERFERENCE AVOIDANCE MESSAGES filed Feb. 1, 2008, and Provisional Application No. 61/047,021 entitled SYSTEMS AND METHODS TO ENABLE AIR-INTERFERENCE AND BACKHAUL SIGNALING FOR INTERFERENCE AVOIDANCE MESSAGES filed Apr. 22, 2008, each of which are assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"SECTOR INTERFERENCE MANAGEMENT BASED ON INTER-SECTOR PERFORMANCE" by Aamod Khandekar et al., having, U.S. application Ser. No. 12/260,834, filed concurrently herewith, assigned to the assignee hereof, and expressly incorporated by reference herein;

"PREAMBLE DESIGN FOR A WIRELESS SIGNAL" by Aamod Khandekar et al., having, U.S. application Ser. No. 12/260,826, filed concurrently herewith, assigned to the assignee hereof, and expressly incorporated by reference herein;

"PREAMBLE DESIGN FOR A WIRELESS SIGNAL" by Aamod Khandekar et al., having, U.S. application Ser. No. 12/260,856, filed concurrently herewith, assigned to the assignee hereof, and expressly incorporated by reference herein; and "PREAMBLE DESIGN FOR A WIRELESS SIGNAL" by Aamod Khandekar et al., having, U.S. application Ser. No. 12/260,861, filed concurrently herewith, assigned to the assignee hereof, and expressly incorporated by reference herein; and "PREAMBLE DESIGN FOR A WIRELESS SIGNAL" by Aamod Khandekar et al., having, U.S. application Ser. No. 12/260,868, filed concurrently herewith, assigned to the assignee hereof, and expressly incorporated by reference herein.

BACKGROUND

I. Field

The following relates generally to wireless communication, and more specifically to employing a backhaul network at least in part to provide reduced interference for a wireless access network.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

In a planned deployment of wireless access networks, air signal interference can result from transmissions by access points (e.g., base stations) as well as access terminals. Interference within a particular cell can be caused by access points and/or access terminals in neighboring cells. Typically, planned deployments are managed by positioning base stations according to transmission power and likely interference. However, interference can still occur between the transmitters, especially when devices utilize low power transmissions. To reduce interference, interference reduction signals can be utilized within an access network. A base station receiving an interference reduction signal can reduce it's transmit power or transmit power of access terminals (ATs) served by the base station. However, where unplanned or semi-planned wireless access point deployments exist, additional interference reduction mechanisms can be helpful for reducing interference in wireless access networks in general.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for interference reduction and/or avoidance utilizing backhaul signaling, at least in part, between wireless access points (APs) of a wireless access network (AN). Signaling can comprise an interference avoidance request (IAR) originated at an AP to reduce signal interference observed at the AP, observed at access terminals (ATs) served by the AP on a forward link, or both. The IAR can be routed via the backhaul network and/or the ATs to one or more interfering APs of the wireless AN. The interfering APs can determine reduced transmit power levels and provide the reduced power levels in response to the IAR to facilitate proper power scheduling at the serving AP. By employing the backhaul network in full or in part, interference avoidance can be conducted for semi-planned or unplanned heterogeneous networks connected to the backhaul.

In at least one aspect of the subject disclosure, provided is a method of managing interference for a mobile AN. The method can comprise identifying interference on a forward link (FL) or reverse link (RL) of a cell of the mobile AN. The method can further comprise employing an AP backhaul network at least in part to facilitate interference communication, wherein the communication comprises a modified transmit power of the cell or an explicit interference reduction request.

According to further aspects, disclosed is an apparatus that manages interference for a mobile AN. The apparatus can comprise a receive signal processor that identifies interference on a FL or RL of a cell of the mobile AN. Further, the apparatus can comprise a transmission processor that employs an AP backhaul network at least in part to facilitate inter-cell interference communication, wherein the communication comprises a modified transmit power commitment of the cell or an explicit interference reduction request.

In at least one additional aspect, provided is an apparatus that manages interference for a mobile AN. The apparatus can comprise means for identifying interference on a FL or RL of a cell of the mobile AN. The apparatus can further comprise means for employing an AP backhaul network at least in part to facilitate interference communication, wherein the communication comprises a modified transmit power of the cell or an explicit interference reduction request.

In addition to the foregoing, disclosed is at least one processor configured to manage interference for a mobile AN. The processor(s) can comprise a first module for identifying interference on a FL or RL of a cell of the mobile AN. The processor(s) can further comprise a second module for employing an AP backhaul network at least in part to facilitate inter-cell interference communication, wherein the communication comprises a modified transmit power commitment of the cell or an explicit interference reduction request.

According to one or more additional aspects, disclosed is a computer-program product comprising a computer-readable medium. The computer-readable medium can comprise a first set of codes for causing a computer to identify interference on a FL or RL of a cell of a mobile AN. The computer-readable medium can further comprise a second set of codes for causing the computer to employ an AP backhaul network at least in part to facilitate inter-cell interference communication, wherein the communication comprises a modified transmit power commitment of the cell or an explicit interference reduction request.

Additionally, provided is a method of facilitating interference avoidance for a wireless AN. The method can comprise participating, at least in part via a backhaul network, in interference communication comprising a modified transmit power of a neighboring cell of the AN or an explicit request to reduce interference on a serving cell of the AN. Further, the method can comprise implementing a scheduling policy for the serving cell based on the modified transmit power, or determining whether to obey the request, respectively.

According to other aspects, disclosed is an apparatus that facilitates interference avoidance for a wireless AN. The apparatus can comprise a signal processor that employs a backhaul network to participates in inter-cell interference communication, the communication comprises a modified transmit commitment of a neighboring cell of the wireless AN or an explicit request to reduce interference on a serving cell of the wireless AN. Furthermore, the apparatus can comprise a priority module that implements a scheduling policy for the serving cell based on the modified transmit power or determines whether to obey the request, respectively.

According to still other aspects, provided is an apparatus that facilitates interference avoidance for a wireless AN. The apparatus can comprise means for participating, at least in part via a backhaul network, in interference communication comprising a modified transmit power of a neighboring cell of the wireless AN or an explicit request to reduce interference on a serving cell of the AN. Additionally, the apparatus can comprise means for implementing a scheduling policy for the serving cell based on the modified transmit power, or determining whether to obey the request, respectively.

In yet other aspects, disclosed is at least one processor configured for facilitating interference avoidance for a wireless AN. The processor(s) can comprise a first module for participating, at least in part via a backhaul network, in interference communication comprising a modified transmit power of a neighboring cell of the wireless AN or an explicit request to reduce interference on a serving cell of the AN. Furthermore, the processor(s) can comprise a second module for implementing a scheduling policy for the serving cell based on the modified transmit power, or determine whether to obey the request, respectively.

In addition to the foregoing, provided is a computer program product comprising a computer-readable medium. The computer-readable medium can comprise a first set of codes for causing a computer to participate, at least in part via a backhaul network, in interference communication comprising a modified transmit power of a neighboring cell of a wireless AN or an explicit request to reduce interference on a serving cell of the AN. The computer-readable medium can further comprise a second set of codes for causing the computer to implement a scheduling policy for the serving cell based on the modified transmit power, or determine whether to obey the request, respectively.

According to at least one or more aspects, provided is a method of facilitating interference avoidance for a wireless AN. The method can comprise generating a wireless channel quality report pertaining to a neighboring cell of the wireless AN. The method can also comprise submitting the wireless channel quality report to a serving cell to facilitate interference management at least in part by way of a backhaul network.

According to further aspects, disclosed is an AT that facilitates interference avoidance for a wireless AN. The AT can comprise a processor that generates a wireless channel quality report pertaining to a neighboring cell of the wireless AN. The AT can further comprise a transmitter that submits the wireless channel quality report to a serving cell to facilitate interference management based on inter-cell backhaul communication.

According to one or more other aspects, disclosed is an apparatus that facilitates interference avoidance for a wireless AN. The apparatus can comprise means for generating a wireless channel quality report pertaining to a neighboring cell of the wireless AN. Furthermore, the apparatus can comprise means for submitting the wireless channel quality report to a serving cell to facilitate interference management at least in part by way of a backhaul network.

According to at least one aspect, provided is at least one processor configured to facilitate interference avoidance for a wireless AN. The processor(s) can comprise a first module for generating a wireless channel quality report pertaining to a neighboring cell of the wireless AN. The processor(s) can additionally comprise a second module for submitting the wireless channel quality report to a serving cell to facilitate interference management at least in part by way of a backhaul network.

In additional aspects, disclosed is a computer program product comprising a computer-readable medium. The computer-readable medium can comprise a first set of codes for causing a computer to generate a wireless channel quality report pertaining to a neighboring cell of the wireless AN. Furthermore, the computer-readable medium can comprise a second set of codes for causing the computer to submit the wireless channel quality report to a serving cell to facilitate interference management at least in part by way of a backhaul network.

In accordance with further aspects, provided is a method of facilitating interference avoidance for a wireless AN. The method can comprise obtaining a signal from a serving cell of the wireless AN, wherein the signal comprises a transmit power commitment or an explicit request to reduce interference. The method can further comprise forwarding the signal OTA to a neighboring cell to facilitate subsequent interference management via an inter-cell backhaul network.

In at least one further aspects, provided is an AT that facilitates interference avoidance for a wireless AN. The AT can comprise a receive signal processor that obtains a signal from a serving cell of the wireless AN, wherein the signal comprising a transmit power commitment or an explicit request to reduce interference. Furthermore, the AT can comprise a transmission processor that forwards the signal OTA to a neighboring cell to facilitate subsequent interference management via an inter-cell backhaul network.

According to one or more other aspects, disclosed is an apparatus that facilitates interference avoidance for a wireless AN. The apparatus can comprise means for obtaining a signal from a serving cell of the wireless AN, the signal comprising a transmit power commitment or an explicit request to reduce interference. The apparatus can comprise means for forwarding the signal OTA to a neighboring cell to facilitate subsequent interference management via an inter-cell backhaul network.

In other aspects, disclosed is at least one processor configured to facilitate interference avoidance for a wireless AN. The processor(s) can comprise a first module for obtaining a signal from a serving cell of the wireless AN, the signal comprising a transmit power commitment or an explicit request to reduce interference. The processor(s) can additionally comprise a second module for forwarding the signal OTA to a neighboring cell to facilitate subsequent interference management via an inter-cell backhaul network.

According to yet other aspects, provided is a computer program product comprising a computer-readable medium. The computer-readable medium can comprise a first set of codes for causing a computer to obtain a signal from a serving cell of the wireless AN, the signal comprising a transmit power commitment or an explicit request to reduce interference. The computer-readable medium can comprise a second set of codes for causing the computer to forward the signal OTA to a neighboring cell to facilitate subsequent interference management via an inter-cell backhaul network.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
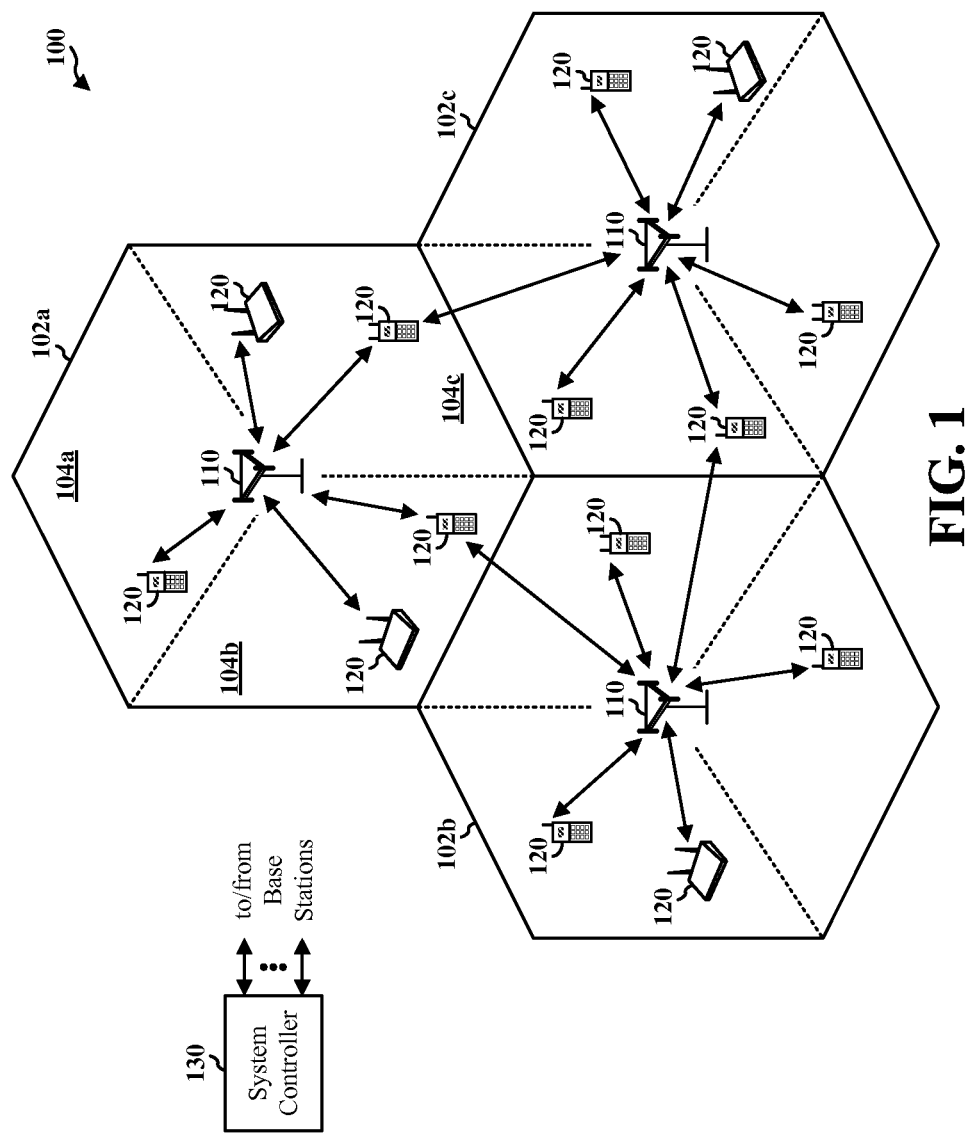
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of implementing inter-sector interference avoidance for a mobile access network (AN). One skilled in the art should appreciate that similar techniques could apply to other communication environments.

As utilized in the subject disclosure, the term heterogeneous network refers to a network of disparate types of base stations deployed within a common or similar bandwidth. The disparate types of base stations can be categorized based on different transmit powers, different association types, whether base stations are inter-connected with a backhaul connection (e.g., a relay base station), or the like, or combinations thereof. A typical macro base station that transmits up to 50 watts versus a typical pico base station that transmits at 1 watt is an example of transmit power disparity. Base stations having different association types can include general access base stations, which provide network access to most or all wireless terminals having a suitable subscription, as compared with restricted access base stations, which provide network connectivity only to a limited subset of terminals having a subscription.

In a dense and/or semi or unplanned wireless access network (AN), forward link (FL) and reverse link (RL) interference in a cell can be dominated by wireless access points (APs) and access terminals (ATs), respectively, in neighboring cells. Furthermore, in a heterogeneous wireless AN, relatively low power APs can exist in range of relatively high power APs, exacerbating the problem of interference. To illustrate, an AP typically transmits at a power related to a geographic area covered by the AP. Such geographic areas can be termed cells, which can vary in size. For instance, a macro-cell can be larger than a micro-cell, pico-cell, femto-cell, etc. Thus, a wireless AP serving the macro-cell can typically transmit at higher power than an AP serving a micro-cell, pico-cell, or femto-cell. For planned networks, APs are positioned an appropriate distance from each other to mitigate interference. The distance can be determined, for instance, on a combined transmit range of two such APs (measured, e.g. within a certain decibel [dB] level). Where placement of APs is only semi-planned or unplanned, significant interference can result in cells served by neighboring APs. One obvious example is that transmissions of a high power macro-cell AP can pose significant interference for lower power APs close to the macro-cell. However, the reverse can also be true. If a terminal served by the macro-cell is also close to a pico-cell, for instance, the pico can be a significant interferer for the macro. Moreover, restricted association APs (e.g., privately owned femto cell APs) can compound this problem. If a terminal is very close to a restricted AP, and is not allowed to connect to such AP, the restricted AP can generate significant interference for the terminal, especially where the nearest general access AP is a great distance from the terminal.

To reduce interference in a wireless AN, (including, e.g. a semi-planned/un-planned network or heterogeneous access type network) the subject disclosure provides a mechanism to implement interference avoidance requests (IARs) utilizing a backhaul network. The backhaul network can comprise a wired and/or wireless communication channel between APs of the wireless AN. The IAR signals are shared among APs to dynamically partition signal strengths and/or resources of wireless signals. Managed use of IAR signals as described herein can result in interference-reduced or interference-free performance for various wireless ANs.

Conventionally, interference from neighboring cells is treated as excess noise at a receiver (e.g., AP or an access terminal [AT] operating with a particular cell). In the alternative, such interference can be reduced based on static fractional frequency re-use. However, such approaches can result in relatively poor wireless link performance and/or inefficient utilization of wireless resources.

Wireless communication for a wireless AN can be classified as forward link communication (e.g., communication from an AP to an AT) and reverse link communication (e.g., communication from the AT to the AP). On the forward link, an AT can experience interference from neighboring APs in neighboring cells. For instance, a signal received at an AT from a serving AP can be co-mingled with signals received from the neighboring APs. Where the neighboring APs are higher power transmitters (e.g., macro-cell APs) than the serving AP (e.g. a pico-cell AP), the forward link interference can significantly deteriorate wireless communication for the AT. Accordingly, management of signal strength and/or channel resources can provide significant benefits for the AT served by a lower power wireless AP.

As a particular example of the foregoing, it can be beneficial for an AT to select an AP with a small path loss as a serving AP. This occurs because a low path loss signal loses less energy a given distance from a transmitting AP, and is received with higher power at a receiver, than a high path loss signal traveling the same distance. Thus, the transmitting AP can utilize less power to transmit the low path loss signal and still achieve similar performance at the receiver. Transmitting at lower power causes smaller interference, on average, to a network, which benefits APs and ATs alike. Despite the benefits of low path loss, a selected AP might have a much lower transmit power than a distant, higher path loss AP transmitting at much higher power. In this case, a signal from the low path loss AP can be significantly weaker as received at the AT than the high path loss AP signal, resulting in high interference. In an alternative scenario, the wireless AP with strong forward link signal strength can be a private AP that does not recognize the AT. Such an AP can deny access to a back-end network (e.g., a mobile communication network, the Internet, or the like) for the AT. In such a case, the AT could be forced to connect to a distant wireless AP having a much weaker signal as received at the AT.

To avoid FL interference, a serving AP can send an IAR signal, which can also be referred to as a resource utilization message [RUM]), to an interfering AP. The IAR can contain a request to reduce transmit power of the interfering AP. In some aspects, the request can specify certain signal dimensions (e.g., signal resources, such as frequency sub-bands, time slots, or the like or a combination thereof) to either avoid transmitting on or reduce transmit power on. The interfering AP can respond to the IAR indicating a reduced transmit power level (e.g., on specified resources) or an interference commitment level. The response can be sent forwarded by the interfering AP over a backhaul network communicatively coupling the serving and interfering APs, and/or via over-the-air (OTA) transmissions to ATs served by the interfering AP.

In at least one aspect of interference management, IARs and/or IAR responses can be exchanged utilizing, at least in part, the backhaul network. Thus, as one example, the IAR can be sent from a serving AP to an interfering AP directly over the backhaul network and the interfering AP can respond directly over the backhaul network. As another example, the serving AP can send the IAR OTA to the interfering AP, which could then respond directly over the backhaul. Sending the IAR OTA can involve, for instance, the serving AP sending a pre-IAR to an AT served by such AP. In this context, the pre-IAR can simply be a request for the AT to forward an IAR message to the interfering AP, or to generate and send the IAR message to the interfering AP, if the AT is configured to do so. Thus, the terminal can forward, or generate and send, an IAR or RUM message OTA to the interfering AP. A response to the OTA IAR/RUM could be received by the serving AP over the backhaul network, as mentioned above. As a third example, the serving AP can send the IAR directly to the interfering AP over the backhaul, which can respond to the IAR by relaying a response OTA via the AT served by the serving AP.

In order to identify an interfering AP for IAR purposes, a serving AP can obtain signal quality reports provided by the AT. Such reports can be sent periodically, sporadically (e.g., when the AT observes a threshold interference from the interfering AP), or upon a request initiated by the serving AP. The signal quality reports can include a list of cell identifiers (IDs) pertaining to neighboring APs and a corresponding interference level for each neighboring AP, as observed by the AT. The signal quality report can thus enable the serving AP to identify one or more significant FL interfering APs as observed at the AT. Utilizing appropriate cell IDs, the serving AP can forward the IAR request directly to the interfering APs, once identified from the signal quality reports.

According to some aspects of the disclosure, the AT can analyze received signals for fractional or low re-use transmissions. In such a context, low re-use transmission, as opposed to full re-use, refers to transmitting data utilizing only a portion of signal resources within a time frame of wireless signal. Such data can, for instance, comprise a preamble of the signal, including acquisition pilot and/or control channel data. The fractional/low re-use resources can comprise suitable time (e.g., sub-frames), frequency (e.g., subcarrier), symbol (e.g., OFDM symbols), and/or code (e.g., as utilized in CDMA) resources of the time frame of the signal. Upon discovering a low re-use transmission, (e.g., a low re-use preamble [LRP]), the AT can identify within the signal quality report that the neighboring AP as a low re-use transmitter. Thus, for example, the list of neighboring APs can include cell ID, interference level as well as whether a LRP is detected for each neighboring AP.

Upon receiving the IAR (e.g. over the backhaul from the serving AP and/or OTA from the AT), an interfering AP can determine whether the IAR should be obeyed. Such determination can be based at least in part on a priority/urgency/quality of service (QoS) level included in the IAR. In some aspects, the determination can also be based on a relative channel gain of the serving AP as compared with the interfering AP, as observed at the AT. The relative channel gain can be inferred, for instance, from a signal quality report (e.g. a pilot strength report) transmitted by the AT. In other aspects, the relative channel gain can be inferred from a received signal strength of an OTA IAR received from the AT.

If the interfering AP determines to obey the IAR, the interfering AP then determines how much power it should transmit. In some aspects, the transmission power can be parsed as a function of channel resources indicated in the IAR(s). For instance, if the IAR provides a particular frequency sub-band, group of sub-bands, a particular time slot and/or set of time slots, the power determination can be with respect to the indicated channel resources only. Thus, where the AT is receiving transmissions from the serving AP on the specified resources, interference can be greatly reduced or avoided. Meanwhile, other resources transmitted by the interfering AP can achieve full power transmission without significantly affecting interference at the AT.

Once the transmission power level of the interfering AP is determined (e.g., with respect to particular signal resources), the interfering AP can convey the determination to the serving AP. In one aspect of the subject disclosure, the interfering AP transmits a power decision signal (e.g., a power decision pilot channel [PDPICH]) having signal strength (e.g., on the particular signal resources) matching the transmission power level. The AT can receive the power decision signal and extract the transmission power level there from. Based on the extracted transmission power level, the AT can calculate an expected signal to noise ratio (SNR) based on signal strength of the serving AP as compared with the transmission power level of the interfering AP. The expected SNR can be forwarded to the serving AP (e.g., in the form of a resource quality indicator channel [RQICH]).

In some aspects, the serving AP can prompt the AT to calculate the SNR and submit the SNR to the serving AP. For instance, where the serving AP sends the original IAR message to the interfering AP over a backhaul network, which might not involve the AT, the serving AP can separately prompt the AT to calculate the above SNR. In some aspects, the prompt can be conditioned on the interfering AP obeying the IAR and sending a response to the serving AP. Thus, the serving AP should expect reduced transmit power level from the interfering AP, and prompt the AT to measure the SNR resulting from the reduced transmit power level. In other aspects, the serving AP can prompt the AT to calculate SNR based simply on sending the pre-IAR.

According to alternative/additional aspects of the subject disclosure, the interfering AP can convey the transmission power level directly to the serving AP over the backhaul network, in response to receiving an IAR. Once the interfering AP modifies transmit power in compliance with the IAR, the serving AP and terminal can perform follow-up interference measurements to determine the effectiveness of the previous IAR. Thus, in one additional aspect of the disclosure, the serving AP can trigger a signal quality report from the AT, which provides an estimate of the interference observed by the AT as a result of modified transmission power level of the interfering AP. In an alternative or additional aspect, the serving AP can wait for the AT to send a periodically scheduled signal quality report that comprises an estimate of interference reflecting the modified transmission power level, in lieu of triggering the follow-up quality report. Once the AT's interference estimate is obtained, the serving AP can then calculate the expected SNR observed by the AT, based on the transmission power level obtained over the backhaul network and/or the signal quality report received OTA form the AT. According to particular aspects, data from the serving AP can be coded and/or modulated in accordance with the expected SNR. Thus, the serving AP can then transmit at an appropriate power level, with appropriate coding or modulation and/or on the specified resources to effect significantly reduced interference at the AT.

In contrast to FL interference, reverse link (RL) interference can result at a wireless AP, obfuscating wireless transmission provided by an AT. The interference can be caused, for instance, by ATs operating in a cell neighboring the wireless AP. As an example to illustrate the foregoing, an AT can select a serving AP that has relatively low path loss transmission with the AT. The AT typically transmits its signal at a strength sufficient to provide reliable reception at the serving AP. Such signal can be received at neighboring APs (e.g. having path loss comparable to or better than the path loss between the AT and its RL serving AP) and constitute unwanted interference on signals that the neighboring APs are demodulating. The foregoing situation can be exacerbated if the serving AP is not the AP with lowest path loss to the AT. This can result from several circumstances, including a large disparity in AP transmit power or when the AT is in a vicinity of private APs with restricted access.

To mitigate RL interference, the subject disclosure provides multiple approaches to manage interference reduction. In one aspect, an air-link mediated RL interference avoidance approach can be utilized. In another aspect, a backhaul mediated RL interference avoidance approach. It should be appreciated that a combination of the foregoing approaches can be utilized as well.

For interference avoidance implemented at least in part OTA, a serving AP can send a pre-assignment signal (e.g., a pre-PDPICH) to an AT served by the serving AP. The pre-assignment signal can include an urgency level associated with RL data transmission utilized by the AT. In some aspects, the pre-assignment signal can also indicate particular channel resources over which the RL data transmissions will be transmitted. In addition, a neighboring AP (observing interference from the AT) can submit an IAR message (e.g., RUM) requesting the AT to reduce transmit power (e.g., on the particular resources). The IAR message can include a priority level, based at least in part on QoS requirements of data flows of the neighboring AP. The AT can then determine a transmit power level (e.g. with respect to the particular resources) based on the urgency level associated with the RL data transmission and the priority level of the neighboring APs. The transmit power level of the AT is broadcast (e.g., in a PDPICH message) to nearby APs, including the serving AP and neighboring APs. The serving AP can then determine a power density profile (PDP) and/or SNR of the AT, based on the transmit power level broadcast by the AT and transmit power levels broadcast by neighboring ATs (e.g., associated with the neighboring AP). The serving AP can then modify RL transmit power (consistent with a PDPICH from the AT), schedule packet coding, packet modulation and/or specified resources to effect reduced communication on the RL.

In the backhaul RL interference avoidance, a first AP sends an IAR message to neighboring APs over a backhaul network communicatively coupling the APs. The IAR can include a request to reduce RL interference caused by ATs in neighboring cells served by the neighboring APs. In some aspects, the IAR can specify particular channel resources for the reduced RL interference. In an alternative aspect, the first AP can indicate a difference between a desired interference to thermal ratio (IoT) level and an observed IoT level (e.g., on particular signal dimensions, such as signal interlaces, sub-bands and/or time slots, or the like). The IAR can further include an urgency level for the request.

Upon receiving the IAR over the backhaul, a neighboring AP can send an interference reduction message (e.g., a power decision message [PDMSG]) to the first AP. The interference reduction message can further indicate an amount of cumulative interference that ATs served by the neighboring AP are likely to cause the first AP on the RL. The cumulative interference of the ATs can be determined as follows. The neighboring AP establishes a transmit power level(s) for the ATs based at least in part on the urgency level specified in the IAR and a QoS priority of ATs served by the neighboring AP that are likely to cause significant RL interference for the first AP. Once the transmit power level(s) is determined, the cumulative interference at the first AP based on RL transmission by the ATs at the established transmit power level(s) can then be determined. As an example, the cumulative interference can be calculated based at least in part on path loss between the ATs and the first AP as compared with path loss between the ATs and the neighboring AP. Path loss information can be obtained, for instance, in resource, pilot, and/or channel quality reports provided by the ATs (e.g., provided periodically, sporadically and/or upon request of an AP, as specified herein). Once the first AP receives the interference reduction message, it can assign a packet format and packet termination target for ATs served by the first AP.

In each of the interference reduction approaches described above and elsewhere herein, both on the RL and FL, transmit power/interference level commitments can be specified for particular channel resources. In addition, the transmit power/interference level commitments can also be specified for, and limited to, a particular period of time. For instance, an IAR or response to the IAR can specify a start time and stop time, start time and duration, or the like.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g. data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with an access terminal—AT. An AT can also be called a system, a subscriber unit, a subscriber station, mobile station, mobile, mobile communication device, mobile device, remote station, remote terminal, user terminal (UT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the Figures, FIG. 1 illustrates a wireless communication system 100 with multiple base stations 110 (e.g., wireless APs) and multiple terminals 120 (e.g. ATs), such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, unless specified otherwise, the term "base station" is used generically for a fixed station that serves a sector as well as a fixed station that serves a cell.

Terminals 120 are typically dispersed throughout the system, and each terminal 120 can be fixed or mobile. Terminals 120 can also be called a mobile station, user equipment, a user device, or some other terminology, as describe above. A terminal 120 can be a wireless device, a cellular phone, a personal digital assistant (PDA), a wireless modem card, and so on. Each terminal 120 can communicate with zero, one, or multiple base stations 110 on the downlink (also termed, e.g. a FL) and uplink (also termed, e.g., a RL) at any given moment. The downlink refers to the communication link from the base stations to the terminals, and the uplink refers to the communication link from the terminals to the base stations.

For a centralized architecture, a system controller 130 couples to base stations 110 and provides coordination and control for base stations 110. For a distributed architecture, base stations 110 can communicate with one another as needed (e.g., by way of a backhaul network communicatively coupling the base stations 110). Data transmission on the forward link often occurs from one access point to one access terminal at or near the maximum data rate that can be supported by the forward link and/or the communication system. Additional channels of the forward link (e.g. control channel) can be transmitted from multiple access points to one access terminal. Reverse link data communication can occur from one access terminal to one or more access points.

Figure 2:
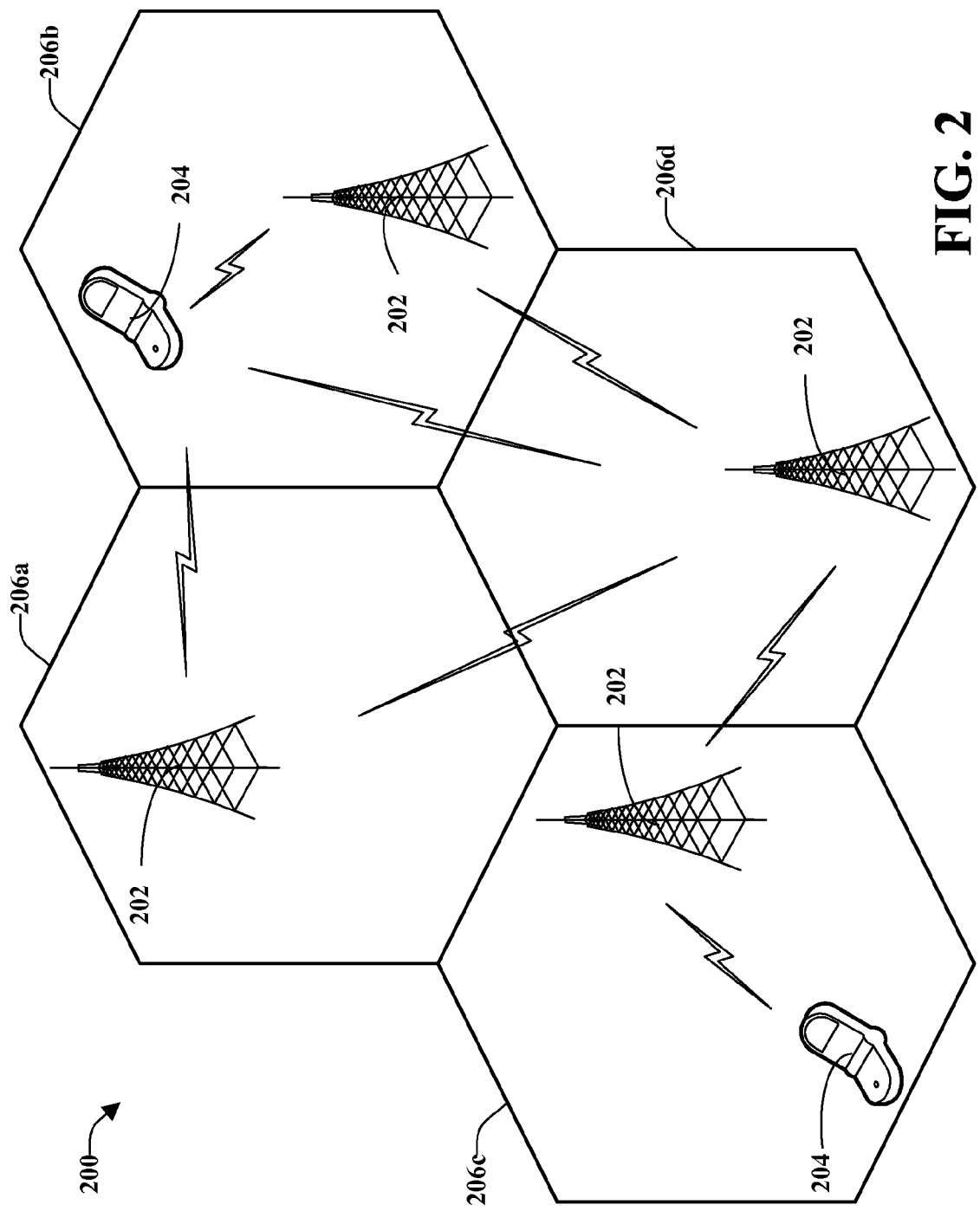
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more wireless APs 202 in one or more cells and/or sectors that receive, transmit, repeat, etc., wireless communication signals to each other and/or to one or more ATs 204. As illustrated, each AP 202 can provide communication coverage for a particular geographic area, illustrated as four geographic areas, labeled 206*a*, 206*b*, 206*c* and 206*d*. Each AP 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. ATs 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate interference reduction among neighboring cells in a wireless communication environment (200) at least in part utilizing a backhaul network (not depicted) coupling the various APs 202, as set forth herein.

Figure 3:
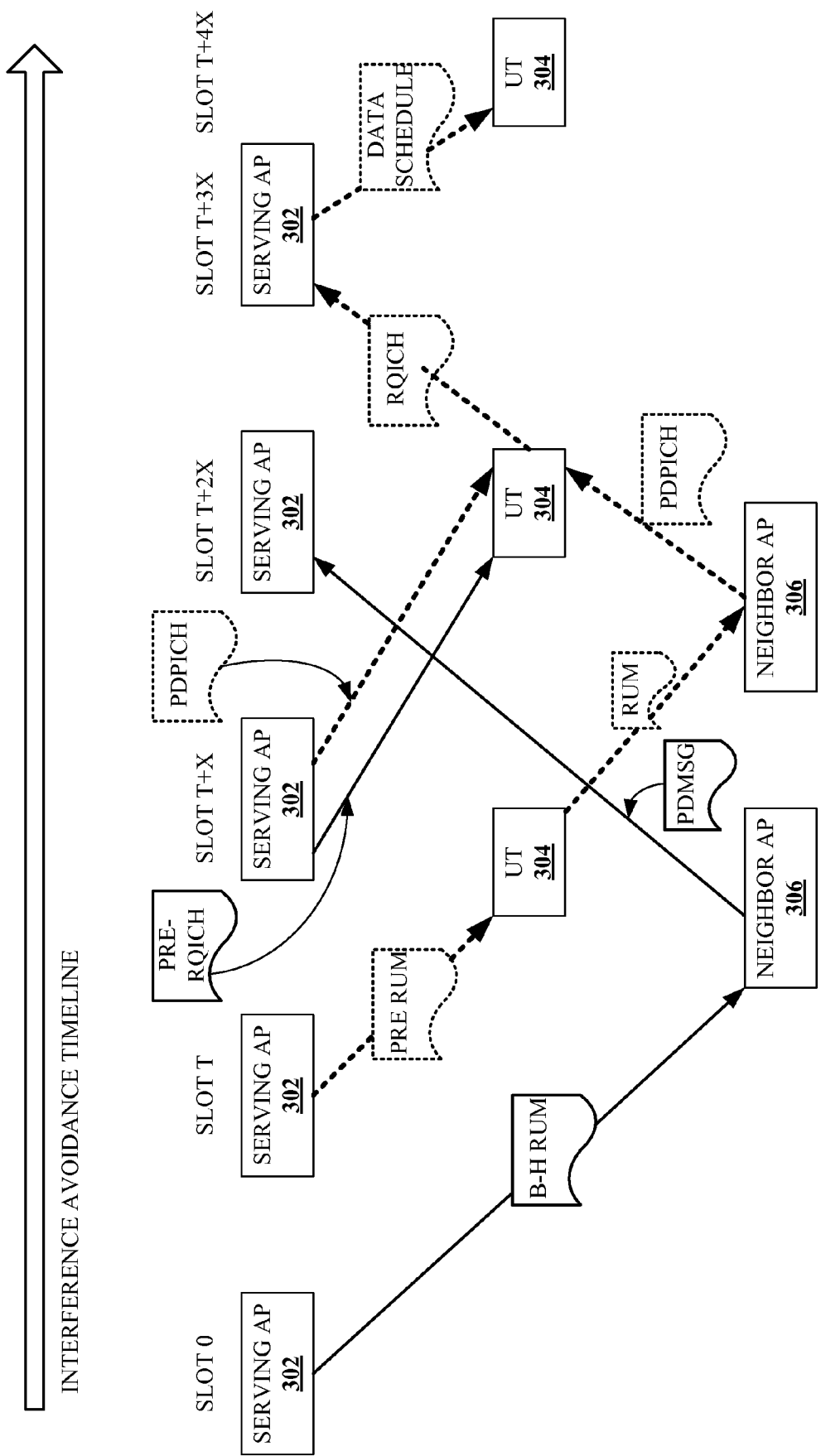
FIG. 3 illustrates a block diagram of an example forward link interference avoidance request (IAR) employing a backhaul of a wireless access network (AN).

FIG. 3 depicts a block diagram of an example FL interference avoidance management for a wireless AN according to one or more aspects of the subject disclosure. As depicted, the interference avoidance example comprises two wireless APs (302, 306) and an AT 304. A first wireless AP (302) is a serving AP for the AT 304. A second wireless AP (306) is an AP of a sector/cell neighboring the serving AP 302 and AT 304. The second wireless AP 306 is referred to as a neighboring AP 306, and transmissions of the neighboring AP 306 can result in interference for the serving AP 302 and AT 304. The particular example depicted at FIG. 3 relates to FL interference caused by the neighboring AP 306 seen at the AT 304 (see FIG. 4, infra, for an example of RL interference management).

The example depicted is modulated by various time slots (illustrates above the blocks representing the serving AP 302), starting at time (T)=0, and progressing to time T (where T is a positive number) and iterations of a time 'X' (e.g., a 10 millisecond frame of a wireless channel), at T+X, T+2X, and so on. It should be appreciated that the neighboring AP 306 can act synchronously with the serving AP 302 (e.g., at the particular serving AP time slots) or asynchronously (e.g. independent of the time frame of the serving AP 302). Furthermore, messages sent in conjunction with OTA interference avoidance mechanism are depicted via dashed lines and dashed message blocks. In contrast, messages sent in conjunction with a backhaul network interference avoidance mechanism are depicted via solid lines a solid message blocks. It should be appreciated, however, that the subject example can utilize a combination of the backhaul and OTA messaging approaches to facilitate backhaul-assisted interference avoidance.

For the backhaul messaging approach, at time slot=0 serving AP 302 provides a backhaul IAR (e.g., a RUM request) to the neighboring AP 306 over a backhaul network communicatively coupling the serving AP 302 and neighboring AP 306. The neighboring AP 306 can respond to the backhaul IAR with a power decision message (e.g., PDMSG), as described herein, and transmit the power decision message over the backhaul network to the serving AP 302. At time slot=T+X, serving AP 302 can initiate a request (e.g., pre-resource quality indicator channel [PRE-RQICH]) for a signal/channel quality report from the AT 304, to determine interference seen by the AT 304 from the neighboring AP 306. At time slot=T+2X the AT 304 can respond to the signal/channel quality report request with the quality report (e.g., RQICH). Based on the signal/channel quality report and the power decision message of the neighboring AP 306, serving AP 302 can schedule data, in a particular packet format, on particular resources, for a particular time period, and or the like, as described herein For the OTA mechanism, at time slot=T the serving AP 302 initiates a pre-IAR (or, e.g. a pre-RUM request) that is transmitted OTA to AT 304. At time=T+X, AT 304 can forward an IAR message (or, e.g. a RUM) based on the pre-IAR to the neighboring AP 306. The IAR message can include a FL priority of the serving AP 302 and/or a relative channel gain as observed at the AT 304 for the serving AP 302 and neighboring AP 306. Furthermore, at time=T+X serving AP 302 can send a power decision message (e.g., PDPICH) to the AT 304, indicating an intended power for FL transmission to the AT 304. Additionally, the neighboring AP 306 can send a power decision message (e.g., PDPICH) to the AT 304 indicating a FL transmit power level based at least in part on the FL priority and/or relative channel gain. At time T+2X the AT 304 can estimate an expected SNR based on the power decision message of the neighboring AP 306 and/or serving AP 302, and forward the SNR in a signal/channel quality indicator (e.g. RQICH) to the serving AP 302. The serving AP 302 receives signal/channel quality indicator from the AT 304, and schedules FL data transmission at a suitable power level based on the SNR (e.g., in a select channel resource(s), period of IAR validity and/or the like).

As mentioned above, a combination of backhaul and OTA messaging can be utilized to accomplish the interference avoidance. For instance, serving AP 302 can send the backhaul IAR to neighboring AP 306, which responds with a power decision message OTA to the AT 304. Alternatively, the serving AP 302 can initiate a pre-IAR OTA to the AT 304, which sends an IAR message to the neighboring AP 306 based on the pre-IAR. The neighboring AP 306 can respond with the power decision message over the backhaul network to the serving AP 302. Other combinations of backhaul and OTA signaling, known in the art or made known to one of skill in the art by way of the context provided herein, are incorporated in the subject disclosure.

Figure 4:
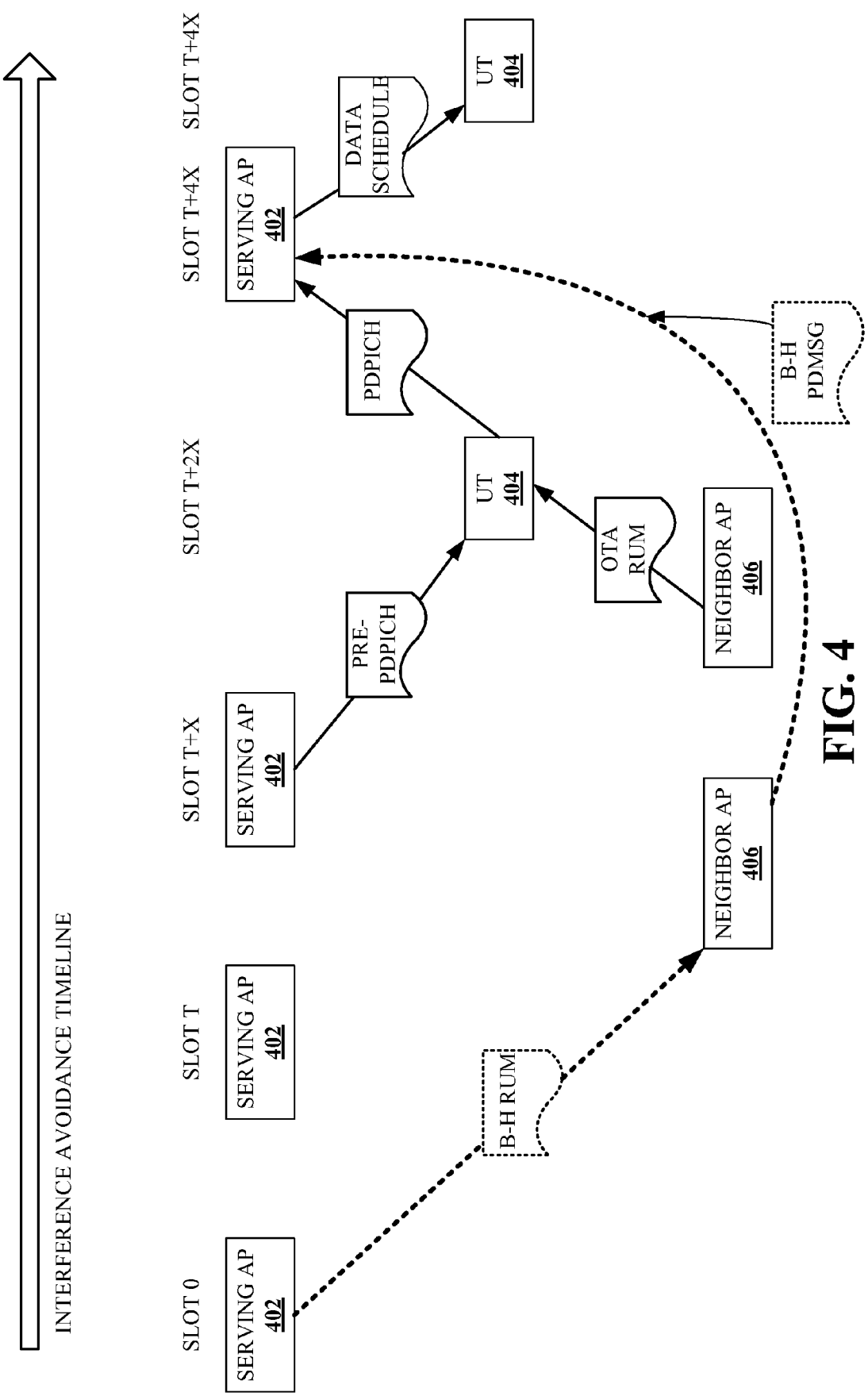
FIG. 4 illustrates a block diagram of an example reverse link IAR between base stations employing the backhaul of the wireless AN.

FIG. 4 illustrates a block diagram of an example of RL interference avoidance management utilizing, at least in part, a backhaul network between wireless APs of a wireless AN. Similar to the FL illustrated at FIG. 3 and described supra, RL interference avoidance as depicted comprises a backhaul approach and an OTA approach. It is to be appreciated that a suitable combination of both approaches can be implemented according to aspects of the subject disclosure.

For the backhaul approach, indicated by the dashed lines and dashed message blocks, serving AP 402 can send a backhaul IAR (e.g., backhaul RUM) to the neighboring AP 406, as described herein. The backhaul IAR can indicate an urgency level with respect to RL communication for an AT 404 served by the serving AP 402. In some aspects, the backhaul IAR can comprise a difference between an observed IoT and a target IoT for the serving AP 402. The neighboring AP 406 can respond to the backhaul IAR with a power decision message transmitted to the serving AP 402 over the backhaul network. The power decision message can comprise an amount of cumulative interference ATs served by the neighboring AP 406 are likely to cause the serving AP on the RL, as described herein. Upon receiving the power decision message, serving AP 402 can assign a suitable transmit power level for the AT 404 (e.g., on particular channel resources, for a particular period of validity of the IAR and IAR response, and so on).

For the OTA approach, indicated by the solid lines and solid message blocks, serving AP 402 can send a pre-assignment message (e.g., pre-PDPICH) to the AT 404, comprising an urgency level for RL transmissions initiated by the AT 404. Additionally, the neighboring AP 406 can send an IAR (or, e.g., an OTA RUM) to the AT 404, requesting reduction of transmit level power (e.g., on certain signal resources, during a specified validity period, etc.) by ATs (404) in sectors near the neighboring AP 406. The IAR request can comprise a priority level associated with RL transmissions associated with the neighboring AP 406. The AT 404 can calculate a transmit power level based on the urgency level of the serving AP 402 and priority level of the neighboring AP 406, and forward the transmit power level to the serving AP OTA (e.g., employing a pilot channel such as a PDPICH). The serving AP 402 can then schedule RL data for the AT 404, as described herein.

Figure 5:
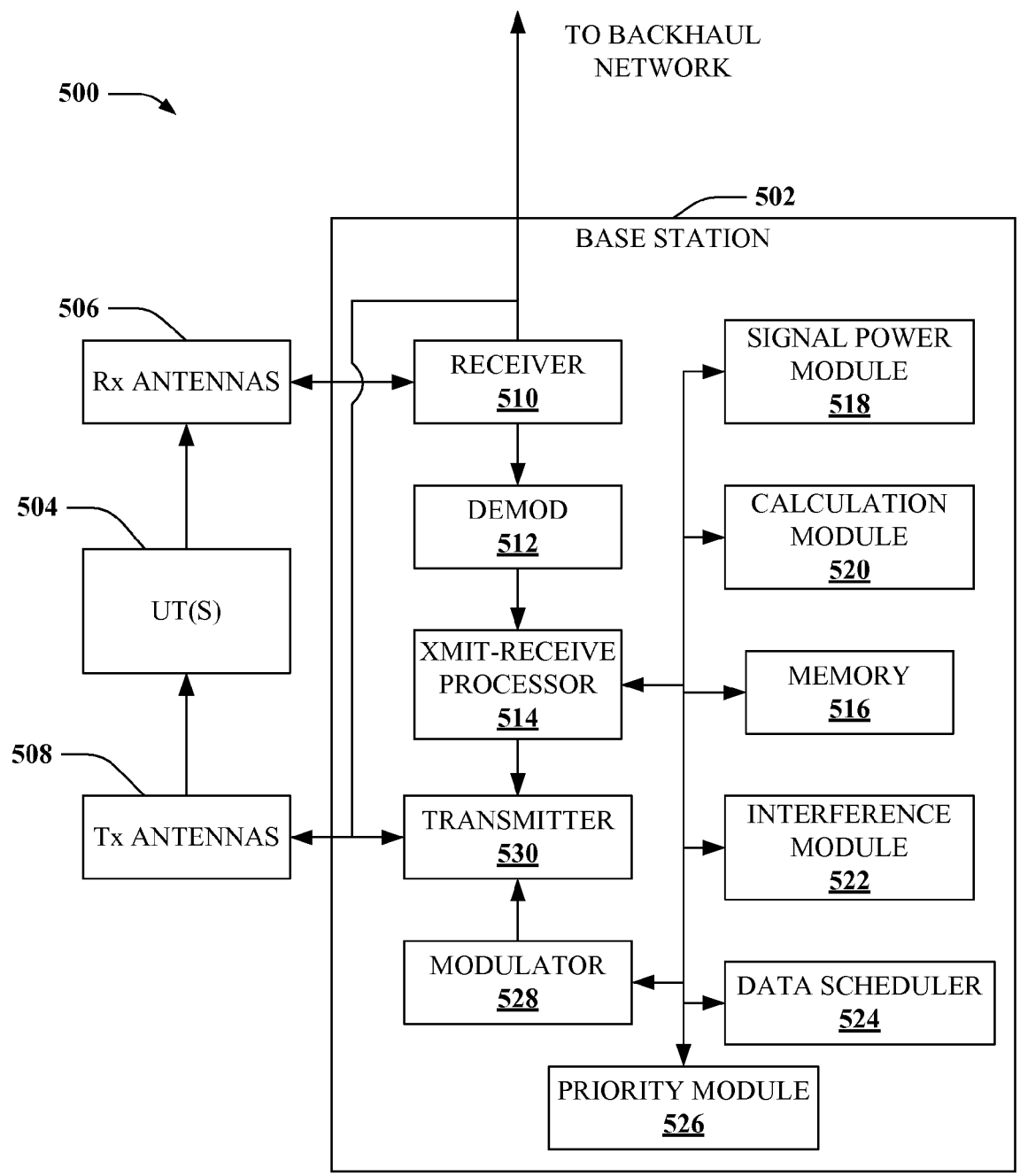
FIG. 5 depicts a block diagram of an example system comprising a base station suitable to submit and/or respond to an IAR according to aspects disclosed herein.

FIG. 5 depicts a block diagram of an example system 500 comprising a base station 502 and one or more ATs 504 according to aspects of the subject disclosure. Base station 502 can be configured to manage interference avoidance for a wireless AN, utilizing backhaul signaling. Base station 502 can be configured to request reduced interference for AT(s) 504 served by the base station 502, as well as respond to an interference reduction request(s) submitted by other such base stations (not depicted). Furthermore, the base station 502 can employ OTA signaling or backhaul data exchange, or a combination thereof, to accomplish the interference avoidance.

Base station 502 (e.g., access point, . . . ) can comprise a receiver 510 that receives signal(s), and over-the-air (OTA) messages from one or more mobile devices 504 through a plurality of receive antennas 506, and a transmitter 530 that transmits coded/modulated OTA messages provided by modulator 520 to the one or more mobile devices 504 through a transmit antenna(s) 508. In addition to the foregoing, receiver 510 and transmitter 530 can exchange data with other network base stations, access points, and the like, via a backhaul network (e.g., employing data communication techniques, such as Internet Protocol [IP], transmission control protocol [TCP], or the like). Receiver 510 can receive information from receive antennas 506 and can further comprise a signal recipient (not shown) that receives uplink data transmitted by mobile device(s) 504. Additionally, receiver 510 is operatively associated with a demodulator 512 that demodulates received information. Demodulated symbols are analyzed by a transmit-receive processor 514 that comprises a receive signal processor (514). Transmit-receive processor 514 is coupled to a memory 516 that stores information related to functions provided by base station 502. In one instance, stored information can comprise protocols for generating, issuing and/or responding to IAR messages, over the air or over the backhaul network. Particularly, the stored information can comprise rules for estimating interference levels for the AT(s) 504 or ATs (504) of a neighboring cell, determining a suitable transmit power with respect to selected channel resources based on the interference level(s), requesting/analyzing signal quality indicator messages from AT(s) 504, or the like, as described herein.

According to some aspects, transmit-receive processor 514 can comprise a transmission processor. The transmission processor (514) can perform various functions suitable for managing interference with neighboring base stations utilizing OTA and/or backhaul signaling. For example, transmission processor (514) can employ the backhaul network to send one or more IAR messages to neighboring base stations. In some aspects, the transmission processor (514) can communicate OTA with AT(s) 504, by employing modulator 528, transmitter 530 and transmit antennas 508. Such communication can be utilized to request a channel quality indicator from the AT(s), which can be utilized to compute interference levels observed by the AT(s) based on signals or signal levels of neighboring base stations. In at least some aspects, the transmission processor (514) can determine an interference to thermal ratio (IoT) level of data flows associated with the AT(s) 504 observed by base station 502, and compare the observed IoT level to a desired IoT level stored in memory 516. Additionally, transmission processor (514) can determine a priority level of the data flows associated with the AT(s) (e.g., based on committed QoS as compared with an achieved QoS of such flows) and couple the priority level with an IAR request. In at least some aspects, transmission processor (514) can further determine a period of validity for an IAR, stored in memory 516 for instance. The period of validity can be included with the IAR and utilized to determine a time frame for reduced interference based on the IAR. Where interference reduction on specific resources is requested, transmission processor (514) can specify a sub-band of a time-slot, a sub-band of set of time-slots, all sub-bands of the time-slot, or all sub-bands of the set or time-slots, as suitable. Determinations of the transmission processor (514) can be forwarded to a signal power module 518, for calculating transmit power of the AT(s) 504, as described herein.

As mentioned above, the transmit-receive processor 514 can comprise a receive signal processor (514). Such processor (514) can obtain information OTA or over the backhaul network from receiver 510. In some aspects, a response to an IAR submitted by transmit processor (514) can be obtained by receive signal processor (514). The receive signal processor (514) can extract information representative of an interference commitment of at least one wireless transmitter (e.g., a neighboring AT or base station) based on the IAR. The interference commitment can be forwarded to the signal power module 518 to calculate transmit power for AT(s) 504 and/or base station 502. In some aspects, the information representative of an interference commitment can comprise a transmit power commitment from an AT in a neighboring cell/sector. Furthermore, receive signal processor (514) can obtain wireless communication quality reports from AT(s) 504 or ATs in the neighboring cell/sector. The quality reports can be utilized by an interference module 522 to map power transmit levels to interference levels, SNR levels, and/or the like, as seen by AT(s) 504 and/or the neighboring ATs. The interference module 522 can identify wireless transmitters that act as significant sources of interference for the AT(s) based on the transmit power/interference level map. In addition to the foregoing, the quality reports can be received periodically, sporadically (e.g., based on a threshold interference at an AT), or upon request from the transmission processor (514). Such quality reports can further comprise a selected transmission power of the AT(s) 504 based on priority of data flows determined by transmission processor (514) and/or urgency levels of interfering ATs in a neighboring sector. The selected transmission power can be provided to a calculation module that determines a power density profile and/or expected SNR for the AT(s) based on such transmission power as compared with transmission power of one or more neighboring AT(s) (e.g., obtained by the receive signal processor 514). Transmit power levels and/or expected SNR can be utilized by a data scheduler 524 to schedule transmit power, at selected channel resources, for determined periods of validity, and/or utilizing selected coding/modulation for the AT(s). Such scheduling can provide significant interference reduction for the AT(s) based on the power level and/or interference commitment levels provided by neighboring base stations and/or AT(s), as described herein.

In at least one additional aspect of the disclosure, base station 502 can comprise a priority module 526. The priority module 526 can be configured to determine whether to obey an IAR obtained by receive signal processor (514) from another base station (e.g., distributed over the backhaul network). The determination can be based on a comparison of a priority level of the IAR and an urgency level of RL or FL transmission associated with the base station 502. The priority and/or urgency level can be determined based on QoS levels of data flows of the AT(s) or of neighboring AT(s). Furthermore, the priority module 526 can determine a period of validity for such determination, based on the period provided in the IAR or based on a specification period stored in memory 516. The priority module 526 can additionally determine one or more channel resources applicable to the IAR, and base the determination at least in part on the requested channel resources as compared with QoS needs of the base station 502 with respect to such channel resources. A result of the priority module 526 determination can be provided to the transmission processor (514) to other components of the base station (514, 518, 520, 522, 524) to carry out functions associated with such components, as described herein.

Figure 6:
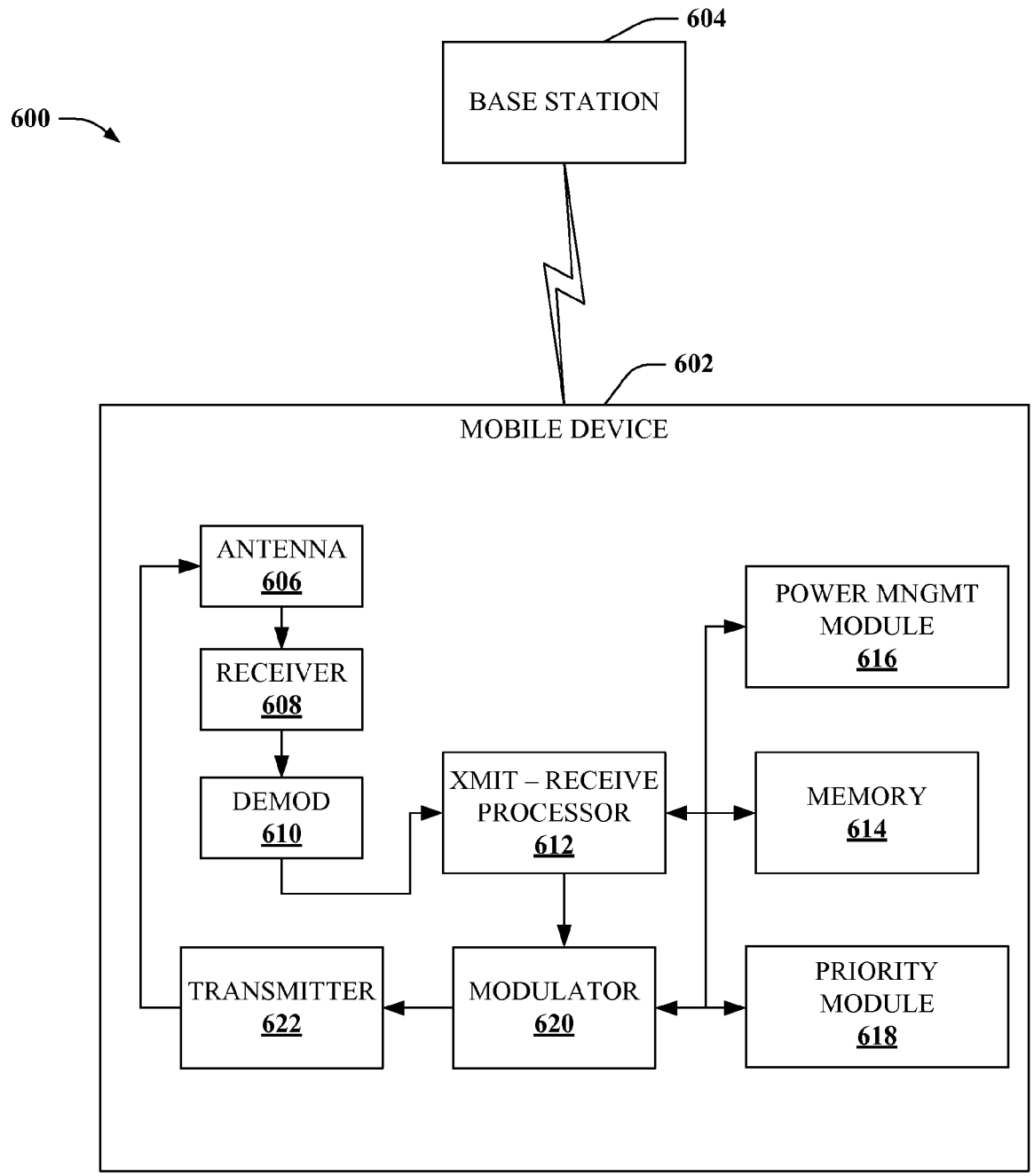
FIG. 6 illustrates a block diagram of an example system comprising an access terminal (AT) that can facilitate backhaul IAR according to some aspects.

FIG. 6 illustrates a block diagram of an example system 600 comprising a mobile device (e.g., an AT) 602 that can facilitate backhaul IAR according to some aspects. Mobile device 602 can be configured to wirelessly couple with one or more base stations 604 (e.g. access point) of a wireless AN. Mobile device 602 can receive OTA messages from the base station 604 on a FL channel and respond with OTA messages on a RL channel, as known in the art. In addition, mobile device 602 can facilitate OTA interference avoidance messaging between the base stations (604) of the wireless AN. For instance, mobile device 604 can receive and forward IAR messages among the base stations, determine instantaneous channel quality at a receiver (608) of mobile device 602, calculate a permissible transmit power for mobile device 602 based on an urgency level assigned to mobile device 602 for RL data and a priority level of a conflicting IAR request, or send channel quality reports to base station 604, as described herein and/or known in the art.

Mobile handset 602 includes at least one antenna 606 (e.g., a transmission receiver or group of such receivers comprising an input interface) that receives a signal (e.g., a paging event transmitted by base station 604 utilizing a system address assigned to mobile handset 602) and receiver(s) 610, which performs typical actions (e.g., filters, amplifies, down-converts, etc.) on the received signal. According to at least some aspects, transmit-receive processor(s) 612 can analyze signals received from demodulator(s) 612 and obtain system IP addresses assigned by mobile networks wirelessly coupled with mobile handset 602 from the analyzed signals (e.g., such system IP addresses can be associated with networks that independently manage device mobility according to at least some aspects). In general, antenna 606 and transmitter 622 (collectively referred to as a transceiver) can be configured to facilitate wireless data exchange with base station(s) 604.

Antenna 606 and receiver(s) 610 can also be coupled with the demodulator(s) 610 that can demodulate received symbols and provide them to the transmit-receive processor(s) 612 for evaluation. It should be appreciated that transmit-receive processor(s) 612 can control and/or reference one or more components (606, 608, 610, 614, 616, 618, 620, 622) of the mobile handset 602. Further, transmit-receive processor(s) 612 can execute one or more modules, applications, engines, or the like (616, 618) that comprise information or controls pertinent to executing functions of the mobile handset 602. For instance, such functions can include receiving an IAR request OTA from a remote source (604), decoding the received data to identify incoming communications for the mobile handset 602, determining interference signals and sources of such interference at receiver 608, adjusting transmit power based on a pilot signal provided by a serving base station (604), provide channel/signal quality reports to one or more base stations (604), or like operations, as described herein.

Mobile handset 602 can additionally include memory 614 that is operatively coupled to transmit-receive processor(s) 612. Memory 614 can store data to be transmitted, received, and the like, and instructions suitable to conduct wireless communication with a remote device (604). Further, memory 616 can store the modules, applications, engines, etc. (616, 618) executed by transmit-receive processor(s) 612, above.

According to particular aspects of the subject disclosure, transmit-receive processor(s) 612 can comprise a transmission processor (612) configured to control modulator 620 and transmitter 622 and receive signal processor (612) configured to extract information obtained at antenna 606 and receiver 608, and demodulated at demodulator 610. The transmission processor can, for instance, provide a channel quality report to a serving base station (604) to facilitate mapping transmit power to interference observed at the mobile device 602. Such quality reports can be updated to the base station 604 periodically, sporadically (e.g., based on observation of a threshold interference level observed by receive signal processor 612) or upon request from base station 604.

The receive signal processor (612), as mentioned above, can obtain IAR messages from a serving base station 604. The IAR message can, for instance, be based on results of a channel/quality report provided to the serving base station (604) by transmission processor (612). For instance, where the serving base station (604) determines a threshold FL interference at the mobile device 602 from the quality report, the IAR can be issued and forwarded via mobile device 602 to an interfering base station (604). Additionally, mobile device 602 can comprise a power management module 616 configured to manage power decision messages for the mobile device 602 and receive and/or process similar messages from neighboring wireless transmitters (604). For instance, power management module 616 can obtain a RL power decision message from a neighboring base station based on an IAR message submitted by mobile device 602 to such neighboring base station. The power decision message can be utilized to estimate an expected SNR at mobile device 602, based on channel interference observed at mobile device 602 at the transmit power level specified in the power decision message. The SNR can be forwarded to the serving base station (604) to facilitate FL transmission levels, coding, modulation, and/or the like of the serving base station (604).

For RL interference determinations of the neighboring base station (604), power management module 616 can determine channel gains for mobile device 602 relative the serving and neighboring base stations (604). Such information can be based on path loss to such base stations (604), or other channel quality conditions (e.g., QoS determinations made by priority module 618). A relative channel gain factor determined by power management module 616 can be provided to transmission processor (612) and forwarded to the neighboring and/or serving base stations (604). For RL data transmissions of the mobile device 602, power management module 616 can further determine a transmit power level for mobile device 602 based at least in part on an urgency rating for the RL data (e.g., obtained from receive signal processor 612 from the serving base station 604) compared with an IAR priority level of an IAR obtained at the receive signal processor (612) from the neighboring base station (604). In some aspects, the transmit priority level can be included in channel quality reports submitted by transmission processor (612) to the serving base station (604), where such reports are submitted periodically, sporadically, or based on request, as described herein.

According to one or more other aspects, mobile device 602 can comprise a priority module 618 that determines a quality of service priority of the mobile device 602 and provides the quality of service priority with an IAR forwarded to a neighboring base station (604). The quality of service priority can be based on an observed QoS factor of data flows of the mobile device 602 as compared with target QoS factors for such flows, stored in memory 614 for instance. Additionally, priority module 602 can parse a priority of a received IAR as compared with an urgency level of data flows of the mobile device 602. The parsed priority v. urgency can be compared with specifications stored in memory and transferred to power management module 616. Such module 616 can computer a transmit power level for the mobile device 602 based on the priority v. urgency and the transmission specifications.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include base station 502, mobile device 602, serving AP 302, and neighboring AP 306, or a different combination of these and other components. Sub-components could also be implemented as components communicatively coupled to other components rather than included within parent components. Additionally, it should be noted that one or more components could be combined into a single component providing aggregate functionality. For instance, signal power module 518 can include calculation module 212, or vice versa, to facilitate determining transmit power level and interference level and/or interference commitment level based on the transmit power level by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
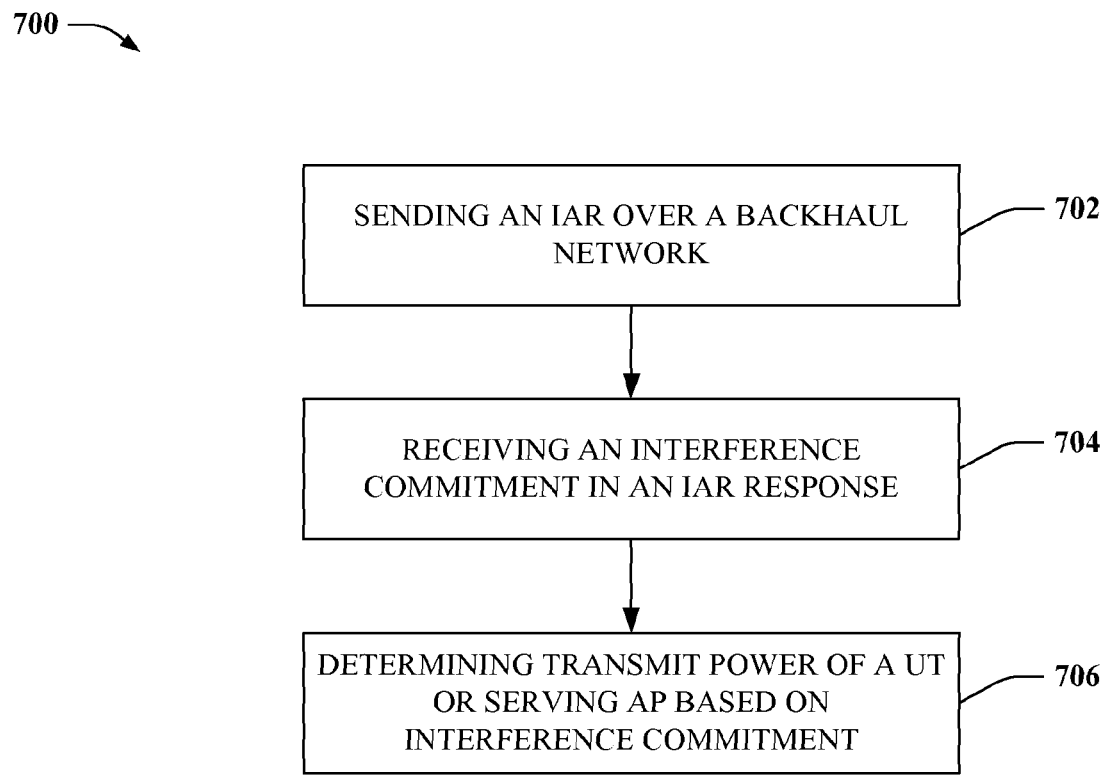
FIG. 7 illustrates a flowchart of an example methodology of employing a backhaul network to conduct IAR messages for a semi or unplanned wireless AN.

FIG. 7 depicts a flowchart of an example methodology 700 of managing OTA interference for a mobile AN. At 702, method 700 can send an IAR message over a backhaul network to a neighboring AP. The IAR message can comprise a request to reduce FL and/or RL transmissions of the neighboring AP and/or ATs served by the neighboring AP, respectively. In addition, the IAR message can specify a priority level with which the IAR message is to be observed (e.g., where such priority is based at least in part on QoS levels of data flows of a selected AT). According to some aspects of the disclosure, the IAR message can further specify one or more channel resources on which to reduce transmission power (e.g., resource(s) can comprise time slot(s), sub-bands, interlaces, and/or the like). According to still other aspects, the IAR can further specify a time period over which the transmission reduction request is valid. Additionally, the IAR can identify an AT to be scheduled on the specified resources (e.g., to enable the neighboring AP better determine an appropriate transmit power level to reduce interference, or to employ spatial techniques, such as beamforming or directional beams, to avoid interfering with the identified AT).

At 704, method 700 can receive a response to the IAR. The response can be representative of an interference commitment of at least one wireless transmitter. The wireless transmitter can comprise a neighboring AP, or one or more ATs served by the neighboring AP. In addition, the interference commitment can be a transmit power level of the neighboring AP/AT(s), a cumulative interference level determined from the transmit power level and signal quality metric provided by the selected AT, a SNR, or the like or a combination thereof.

At 706, method 700 can determine a transmit power based at least in part on the interference commitment for the selected AT (e.g., with regard to RL data transmission) or a serving AP communicatively coupled with the AT (e.g. with regard to FL data transmission).

Figure 8:
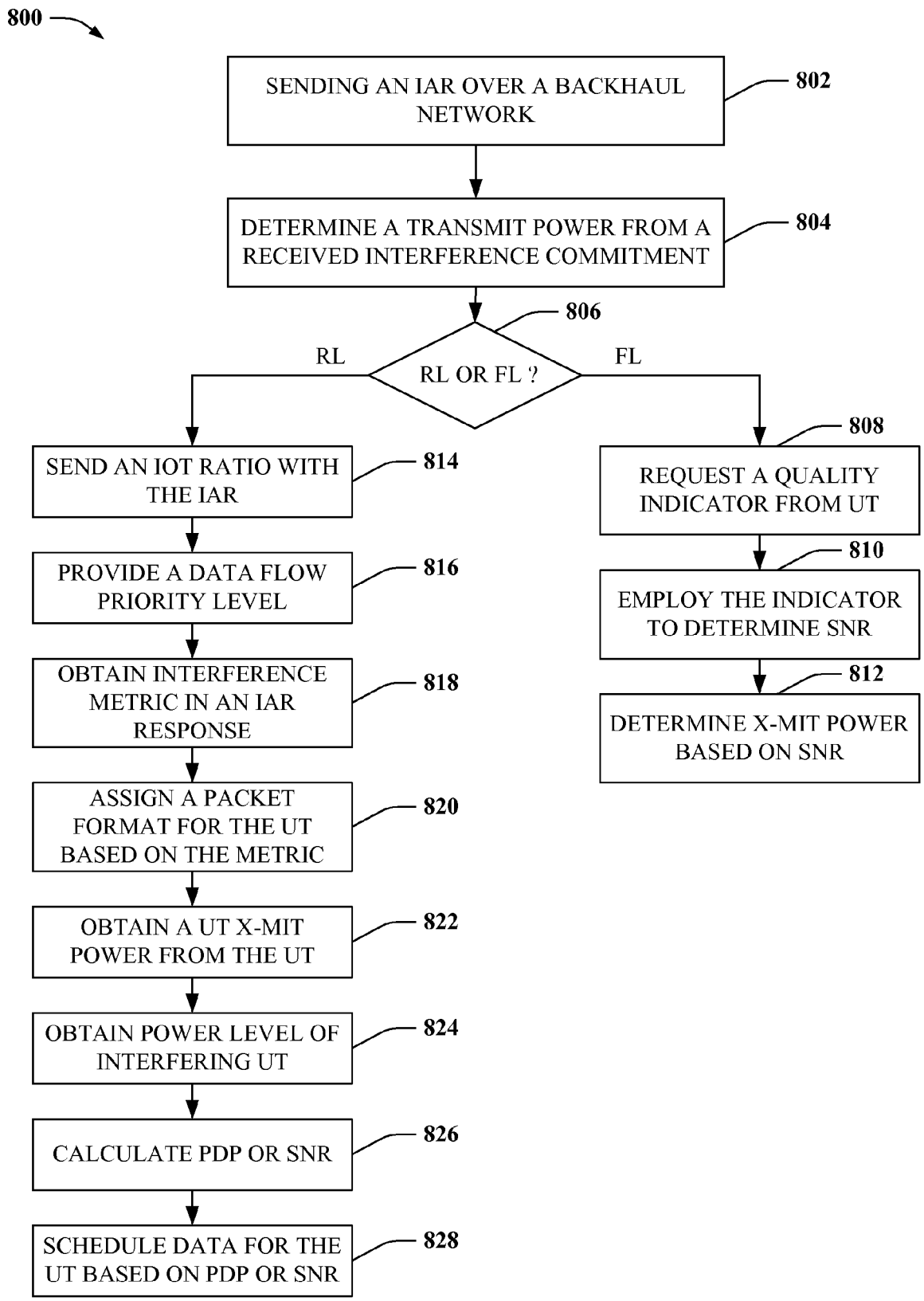
FIG. 8 illustrates a flowchart of an example methodology for employing a backhaul network for forward link (FL) and reverse link (RL) IAR messages.

FIG. 8 illustrates a flowchart of an example methodology 800 for employing a backhaul network for forward link (FL) and reverse link (RL) IAR messages. At 802, method 800 can send an IAR over a backhaul network. The IAR can be initiated based on identification of a significant level of interference observed at an AT. The interference and transmitter causing the interference can be determined from a channel quality report received at the AT. By obtaining the signal quality report, the IAR can be generated and directed to the source of the interference. In addition, the IAR can include other information determined by method 800, as described below.

At 804, an interference commitment level can be received in response to the IAR, and a transmit power determined. The interference level can be received over the backhaul network or OTA. Further, the transmit power can be based on whether the IAR is for RL or FL interference reduction, which can be determined at 806. If the IAR is for FL interference, method 800 can proceed to 808. For RL interference, method 800 can proceed to 814.

At 808, method 800 can request a quality indicator from an AT. The quality indicator can comprise instantaneous channel quality information as observed by the AT. At 810, method 800 can employ the quality indicator information to determine a SNR observed at the AT based at least in part on the interference commitment received in response to the IAR. At 812, method 800 can determine the transmit power utilizing the SNR or interference commitment level.

At 814, method 814 can determine an IoT ratio of an observed v. expected IoT level and include the relative IoT level(s) with the IAR. At 816, a data flow priority level can also be determined and included with the IAR. At 818, an interference metric of the IAR response is obtained. At 820, a packet format for the AT is assigned based at least in part on a priority level of data flows of the AT and the interference metric. At 822, an AT transmit power can be obtained from the AT (e.g., determined at the AT based on priority level and an urgency level of data flows of an interfering AP). At 824, a power transmit level of the interfering AP can be obtained, e.g. from the AT or over the backhaul network. AT 826, a power density profile (PDP) or SNR can be calculated for the AT. At 828, RL data for the AT can be scheduled based on the SNR or PDP. The RL data can be scheduled for particular channel resources specified in the IAR or for a particular period of time.

Figure 9:
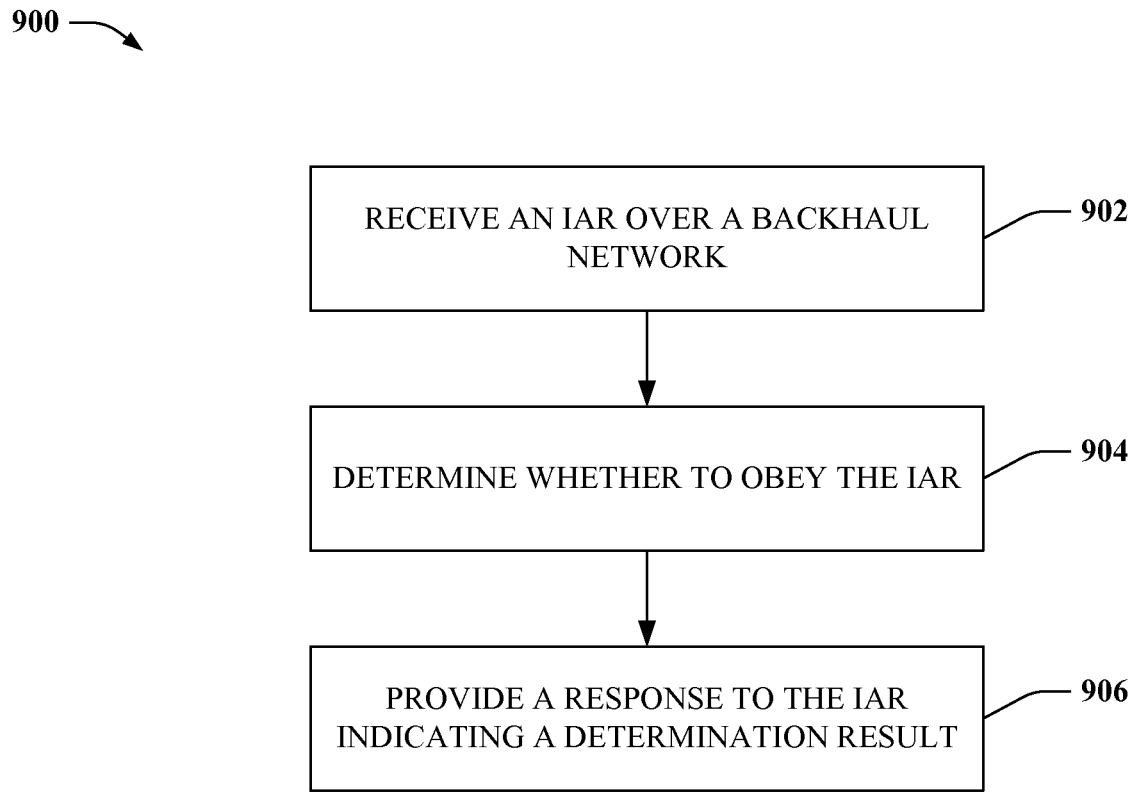
FIG. 9 depicts a flowchart of an example methodology for responding to an IAR according to one or more aspects.

FIG. 9 depicts a flowchart of an example methodology 900 for responding to an IAR according to one or more aspects. At 902, method 900 can receive an IAR message over a backhaul network. At 904, a determination can be made as to whether to obey the IAR message. The determination to obey the message can be based at least in part on a priority level of the IAR as compared with an urgency level of data flows of a serving AP and/or served ATs. At 906, a response to the IAR can be provided indicating a result of the determination. The response can be sent over the backhaul network, or OTA via the served ATs. Furthermore, the result can include a transmit power level of the serving AP, for a FL IAR request, or an interference commitment level for RL IAR request. The transmit power level can be determined based on a priority level of the IAR compared with an urgency level of data flows of the one or more ATs. The interference commitment level can be calculated based on a signal quality resource indicator obtained from an AT of a neighboring AP. Such indicator can provide a level of interference of the ATs at an AP sending the IAR, enabling mapping of a transmit power level to interference at the AT providing the signal quality resource.

Figure 10:
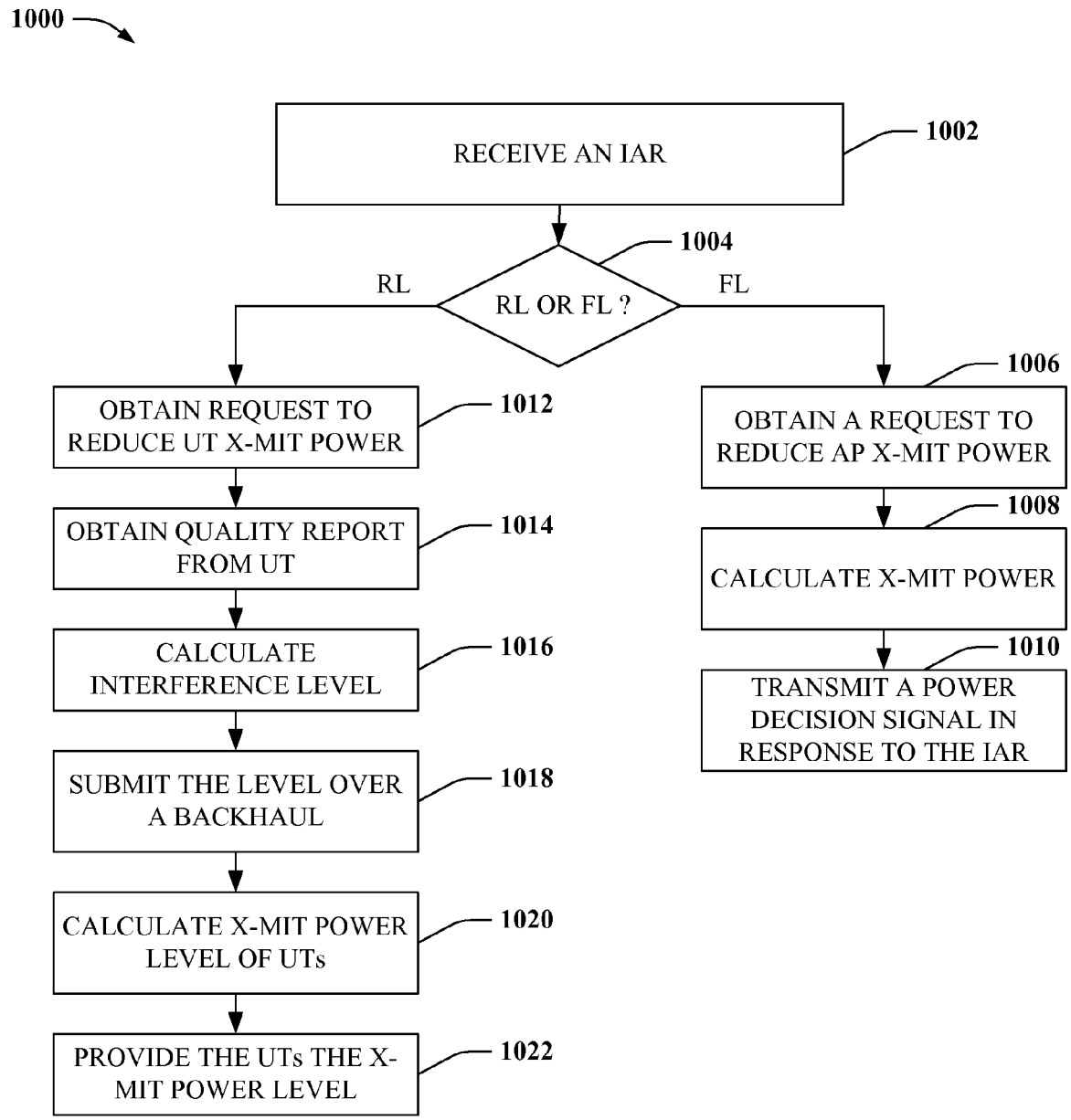
FIG. 10 illustrates a flowchart of a sample methodology for responding to FL and/or RL IAR messages according to further aspects.

FIG. 10 illustrates a flowchart of an example methodology for responding to RL and FL IAR requests utilizing, at least in part, a backhaul network between wireless APs. At 1002, method 1000 can receive an IAR request. The request can be distributed over a backhaul network coupling wireless APs of a wireless AN, or OTA from an AT of a neighboring cell. At 1004, a determination is made as to whether the IAR relates to FL or RL transmission. If FL transmission, method 1000 proceeds to 1006. Otherwise, method 1000 proceeds to 1012.

At 1006, method 1000 can obtain a request to reduce AP transmit power from the IAR. The request can specify one or more resource channels over which power reduction is to be implemented, a validity period associated with the IAR over which power reduction is to be sustained, and so on. The request can further indicate a request priority (e.g., based on QoS requirements of a requesting entity). At 1008, method 1000 can calculate a transmission power for the AP, as described herein. At 1010, a power decision signal can be transmitted provided the transmission power in response to the IAR. The signal can be provided to an AT associated with the IAR, or over a backhaul network to an AP issuing the IAR.

At 1012, method 1000 can obtain a request to reduce transmit power of one or more ATs from the IAR. The request can comprise a period of validity of the request, one or more resource channels for the power reduction and/or a request priority level, as described herein. At 1014, method 1000 can obtain a signal/channel quality report from an AT associated with the IAR. The quality report can specify an interference level observed at an AP issuing the IAR. At 1016, an interference level in the quality report is utilized to calculate an interference commitment level for ATs interfering with the issuing AP. At 1018, the commitment level is submitted to the issuing AP over the backhaul network, or OTA via the AT associated with the IAR. At 1020, a transmit power required to meet the interference commitment level can be calculated, based at least in part on the signal/channel quality information. At 1022, a RL data schedule for the interfering ATs that corresponds with the calculated transmit power is forwarded to the ATs.

Figure 11:
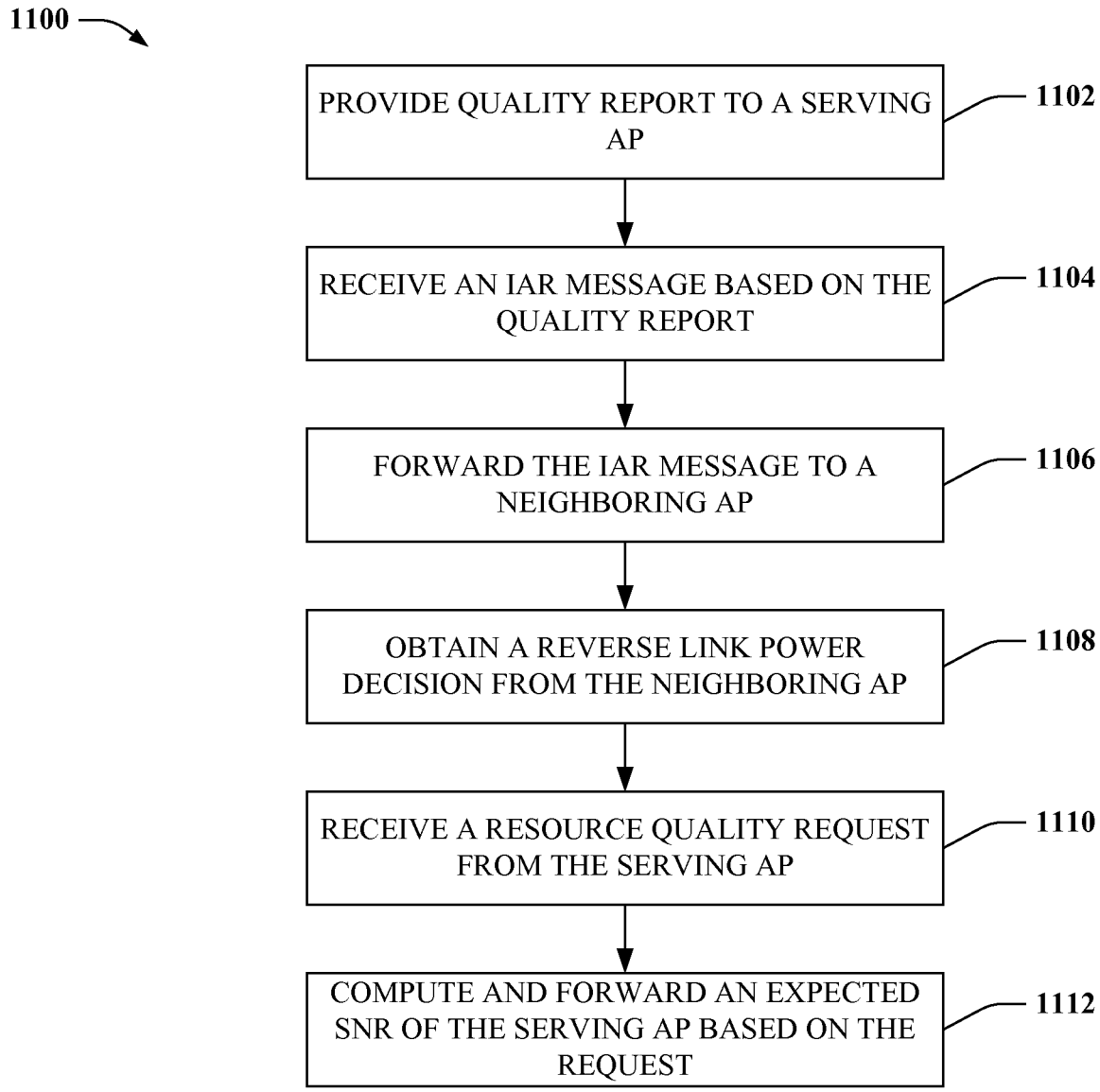
FIG. 11 depicts a flowchart of an example methodology for facilitating FL backhaul IAR messages for a semi or unplanned wireless AN.

FIG. 11 depicts a flowchart of an example methodology 1100 for facilitating FL backhaul IAR messages for a semi or unplanned wireless AN. At 1102, method 1100 can provide quality reports to a serving AP. The quality provides can provide data indicative of channel interference information, or suitable to map channel interference information to transmit power of a wireless transmitter. The quality reports can be provided periodically, sporadically (e.g., upon determining a threshold interference) or upon request of an AP. At 1104, method 1100 can receive a pre-IAR message based at least in part on the provided quality report. At 1106, the pre-IAR can be converted to an IAR and forwarded to an interfering AP. The IAR can comprise a validity period of the IAR, a request to reduce transmit power, resource channels over which power reduction should be implemented and/or the like. At 1108, method 1100 can obtain a RL power decision from the neighboring AP. At 1110, method 1100 can receive a resource quality request from a serving AP. At 1112, method 1100 can respond to the resource quality request, indicating a SNR and/or PDP for the serving AP based on the request.

Figure 12:
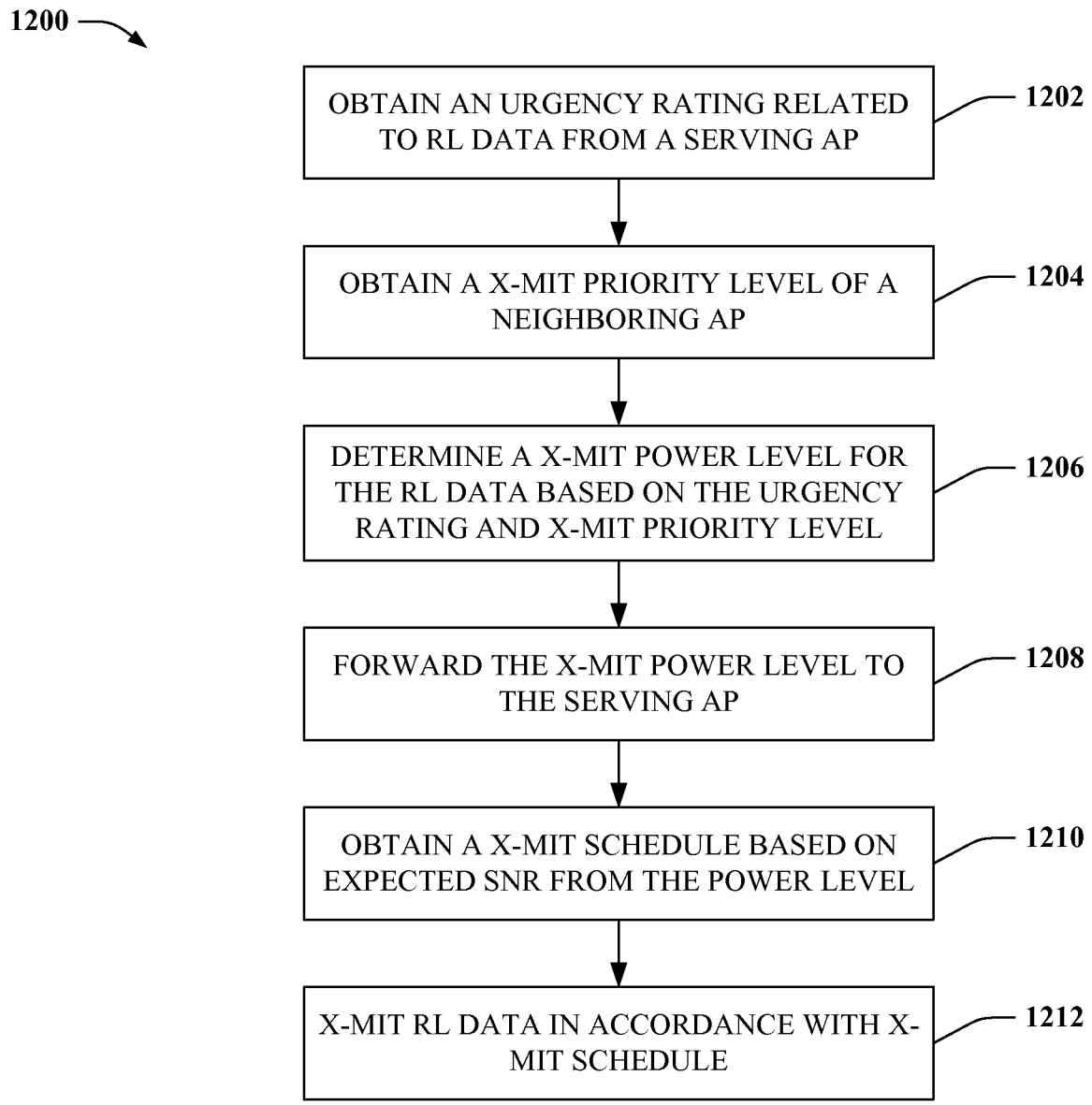
FIG. 12 illustrates a flowchart of an example methodology for facilitating RL backhaul IAR messages for the semi or unplanned wireless AN.

FIG. 12 depicts a flowchart of an example methodology 1200 for facilitating RL interference avoidance according to one or more aspects of the subject disclosure. At 1202, method 1200 can obtain an urgency rating relative to RL data from a serving AP. At 1204, method 1200 can receive an IAR request from a neighboring AP, which comprises an IAR priority level. At 1206, a transmission power based at least in part on the urgency rating and/or IAR priority level can be determined. At 1208, the transmit power level is forwarded to the serving AP. At 1210, a RL transmission schedule, as described herein, is obtained based at least in part on an expected SNR determined from the transmission level. At 1212, RL data can be transmitted in accordance with the RL transmission schedule.

Figure 13:
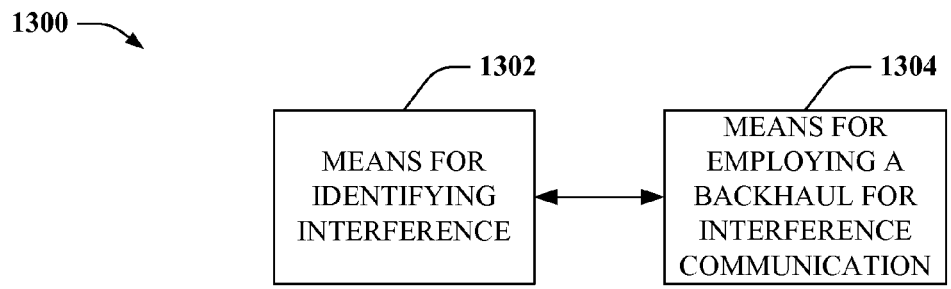
FIG. 13 depicts a block diagram of an example system that provides interference avoidance utilizing a backhaul network according to some aspects.

FIG. 13 illustrates a block diagram of a sample system 1300 that provides interference avoidance in a mobile AN, at least in part utilizing a backhaul network. The system 1300 can comprise a means 1302 for identifying interference on a FL or RL of a cell of the mobile AN. Additionally, system 1300 can comprise a means 1304 for employing an AP backhaul network to facilitate interference communication. For instance, the backhaul network can be employed at least in part to generate a transmit power commitment and send such commitment to a neighboring cell of the mobile AN. Alternatively, or in addition, the communication can comprise an explicit request to reduce interference on one or more wireless resources, optionally specifying the resources, a priority for such request or duration of the request.

Figure 14:
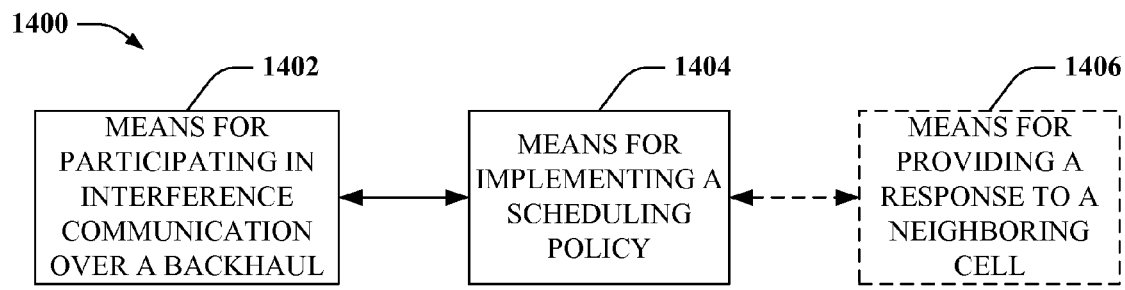
FIG. 14 illustrates a block diagram of an example system that responds to an IAR message over a backhaul network in accordance with other aspects.

FIG. 14 depicts an example block diagram of a system 1400 that facilitates RL or FL interference avoidance in a wireless AN. System 1400 can comprise a means 1402 for participating in interference communication. The interference communication can be conducted to by means 1402 at least in party via a backhaul network coupling two or more cells of the wireless AN. In some aspects, the interference communication can comprise a modified transmit power of a neighboring cell of the wireless AN, or an explicit request to reduce interference on a serving cell of the wireless AN. Furthermore, the explicit request can comprise one or more channel resources for interference reduction, a priority of the explicit request, and a period of validity for such request, in some aspects of the subject disclosure. Additionally, system 1400 can comprise a means 1404 for implementing a scheduling policy for the serving cell based on the modified transmit power, or for determining whether to obey the explicit request, respectively. Such means can employ the scheduling policy to schedule FL or RL transmission in a mobile communication network. Alternatively, or in addition, the means 1404 can employ the priority of the explicit request compared with a priority level of traffic flows of the serving cell, at least in part, in determining whether to obey the request. In some aspects, system 1400 can optionally (as depicted by the dashed lines) comprise a means 1406 for providing a response to the neighboring cell regarding the modified transmit power, or the explicit request to reduce interference, as described herein.

Figure 15:
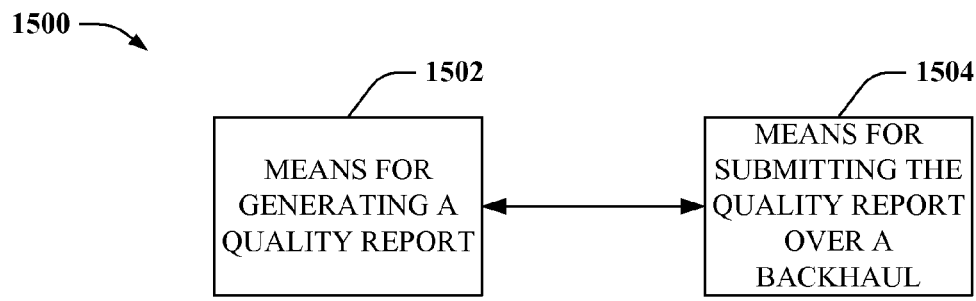
FIG. 15 depicts a block diagram of a sample system that can facilitate FL IAR requests in a wireless AN.

FIG. 15 depicts a block diagram of an example system 1500 suitable to facilitate interference avoidance in a wireless AN. System 1500 can comprise a means 1502 for generating a wireless channel quality report. The quality report can comprise information pertaining to instantaneous channel quality of a cell of the wireless AN as observed at a wireless transceiver. Such information can include, for instance, level of interference from one or more identified transmitters, channel resources experiencing interference, estimated transmit power of interfering entities, signal path loss to the one or more identified transmitters, or a combination thereof or of the like. System 1500 can further comprise a means 1502 for submitting the wireless channel quality report to a serving cell of the wireless AN. Submission of the quality report can facilitate interference management between the cell and the serving cell at least in part by way of a backhaul network coupling such cells. In some aspects, means 1502 can submit the quality reports periodically, sporadically, or upon receiving a request.

Figure 16:
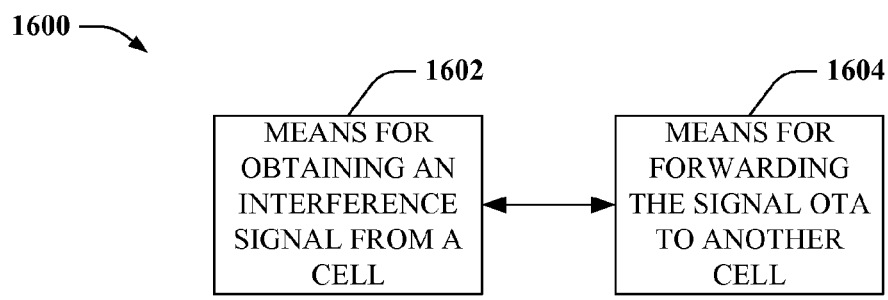
FIG. 16 illustrates a block diagram of an example system that can facilitate RL IAR requests in the wireless AN.

FIG. 16 illustrates a block diagram of an example system 1600 that can facilitate interference reduction for RL transmissions of a wireless AN. System 1600 can comprise a means 1602 for obtaining a signal from a serving cell of a wireless AN. The means 1602 can comprise, for instance, a receive antenna as well as a receive processor for decoding the signal. In some aspects, the signal can comprise a transmit power commitment of the serving cell, or an explicit request for a neighboring cell to reduce interference. Such reduction in interference can pertain to one or more resources of a FL or RL wireless communication channel. System 1600 can additionally comprise a means 1604 for forwarding the signal OTA to the neighboring cell. Particularly, the signal can be forwarded OTA to facilitate subsequent interference avoidance between the serving cell and the neighboring cell at least in part via the backhaul.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of managing interference by a serving access point (AP), comprising:

identifying a neighboring AP whose transmissions on particular resources potentially interfere with transmissions between the serving AP and a served access terminal (AT);

sending a request for the neighboring AP to modify transmissions on the particular resources, wherein the request specifies the particular resources on which the neighboring AP's transmissions potentially interfere with the transmissions between the serving AP and the served AT, and wherein the request comprises a priority level associated with the specified particular resources on which the neighboring AP's transmission potentially interfere with the transmissions between the serving AP and the served AT;

receiving a response to the request transmitted directly to the serving AP from the neighboring AP and indicating whether or not the request will be obeyed by the neighboring AP, wherein, an indication that the neighboring AP will obey the request indicates that the neighboring AP will allocate, based on the request, available transmission power between the specified particular resources and the other resources used by the neighboring AP;

receiving a signal quality report from the served AT; and scheduling data transmissions to the served AT based, at least in part, on the signal quality report and the response to the request.

2. The method of claim 1, wherein the particular resources comprise at least one of a particular frequency sub-band, a group of sub-bands, a particular time slot, or a group of time slots.

3. The method of claim 1, wherein the request is sent to the neighboring AP via a backhaul network.

4. The method of claim 3, wherein the response to the request is transmitted from the neighboring AP to the serving AP over the backhaul network.

5. The method of claim 1, wherein the request is sent to the neighboring AP over the air (OTA), via the served AT.

6. The method of claim 1, wherein the request is for the neighboring AP to at least one of refrain from transmitting or reduce power for transmissions on the particular resources.

7. An apparatus for managing interference, comprising:
means for identifying a neighboring AP whose transmissions on particular resources potentially interfere with transmissions between the apparatus and a served access terminal (AT);
means for sending a request for the neighboring AP to modify transmissions on the particular resources, wherein the request specifies the particular resources on which the neighboring AP's transmissions potentially interfere with the transmissions between the serving AP and the served AT, and wherein the request comprises a priority level associated with the specified particular resources on which the neighboring AP's transmission potentially interfere with the transmissions between the serving AP and the served AT;
means for receiving a response to the request transmitted directly to the serving AP from the neighboring AP and indicating whether or not the request will be obeyed by the neighboring AP, wherein, an indication that the neighboring AP will obey the request indicates that the neighboring AP will allocate, based on the request, available transmission power between the specified particular resources and the other resources used by the neighboring AP;
means for receiving a signal quality report from the served AT; and
means for scheduling data transmissions to the served AT based, at least in part, on the signal quality report and the response to the request.

8. The apparatus of claim 7, wherein the particular resources comprise at least one of a particular frequency sub-band, a group of sub-bands, a particular time slot, or a group of time slots.

9. The apparatus of claim 7, wherein the request is sent to the neighboring AP via a backhaul network.

10. The apparatus of claim 9, wherein the response to the request is transmitted from the neighboring AP to the apparatus over the backhaul network.

11. The apparatus of claim 7, wherein the request is sent to the neighboring AP over the air (OTA), via the served AT.

12. The apparatus of claim 7, wherein the request is for the neighboring AP to at least one of refrain from transmitting or reduce power for transmissions on the particular resources.

13. An apparatus, comprising:
at least one processor configured to identify a neighboring AP whose transmissions on particular resources potentially interfere with transmissions between the apparatus and a served access terminal (AT), send a request for the neighboring AP to modify transmissions on the particular resources, receive a response to the request transmitted directly to the serving AP from the neighboring AP and indicating whether or not the request will be obeyed by the neighboring AP; receive a signal quality report from the served AT, and schedule data transmissions to the served AT based, at least in part, on the signal quality report and the response to the request, wherein the request specifies the particular resources on which the neighboring AP's transmissions potentially interfere with the transmissions between the serving AP and the served AT, wherein the request comprises a priority level associated with the specified particular resources on which the neighboring AP's transmission potentially interfere with the transmissions between the serving AP and the served AT, and
wherein, an indication, in the response, that the neighboring AP will obey the request indicates that the neighboring AP will allocate, based on the request, available transmission power between the specified particular resources and the other resources used by the neighboring AP; and
a memory coupled with the at least one processor.

14. A computer program product for managing interference by a serving access point (AP), comprising a non-transitory computer-readable medium having stored thereon:
code for identifying a neighboring AP whose transmissions on particular resources potentially interfere with transmissions between the serving AP and a served access terminal (AT);
code for sending a request for the neighboring AP to modify transmissions on the particular resources, wherein the request specifies the particular resources on which the neighboring AP's transmissions potentially interfere with the transmissions between the serving AP and the served AT, and wherein the request comprises a priority level associated with the specified particular resources on which the neighboring AP's transmission potentially interfere with the transmissions between the serving AP and the served AT;
code for receiving a response to the request transmitted directly to the serving AP from the neighboring AP and indicating whether or not the request will be obeyed by the neighboring AP, wherein, an indication that the neighboring AP will obey the request indicates that the neighboring AP will allocate, based on the request, available transmission power between the specified particular resources and the other resources used by the neighboring AP;
code for receiving a signal quality report from the served AT; and
code for scheduling data transmissions to the served AT based, at least in part, on the signal quality report and the response to the request.

15. A method of managing interference by a neighboring access point (AP), comprising:
receiving a request, from a serving access point (AP), for the neighboring AP to modify transmissions on specified resources, wherein the specified resources include resources on which transmissions by the neighboring AP cause interference for the serving AP, and wherein the request comprises a priority level associated with the specified resources on which the neighboring AP's transmission potentially interfere with transmissions between the serving AP and a served access terminal (AT);

deciding whether or not to modify the transmissions on the specified resources in accordance with the request, wherein, in response to a decision to modify the transmissions on the specified resources, the neighboring AP allocates available transmission power between the specified resources and the other resources used by the neighboring AP based on the request; and transmitting, directly to the serving AP from the neighboring AP, a response to the request to indicate the decision to the serving AP.

16. The method of claim 15, wherein the specified resources comprise at least one of a particular frequency sub-band, a group of sub-bands, a particular time slot, or a group of time slots.

17. The method of claim 15, wherein the request is received from the serving AP via a backhaul network.

18. The method of claim 17, wherein the response to the request is transmitted from the neighboring AP to the serving AP over the backhaul network.

19. The method of claim 15, wherein the request is sent to the neighboring AP over the air (OTA), via the served AT.

20. The method of claim 15, wherein the request is for the neighboring AP to at least one of refrain from transmitting or reduce power for transmissions on the specified resources.

21. An apparatus, comprising:
means for receiving a request, from a serving access point (AP), for a neighboring AP of the apparatus to modify transmissions on specified resources, wherein the specified resources include resources on which transmissions by the neighboring AP cause interference for the serving AP, and wherein the request comprises a priority level associated with the specified resources on which the neighboring AP's transmission potentially interfere with transmissions between the serving AP and a served access terminal (AT);
means for deciding whether or not to modify the transmissions on the specified resources in accordance with the request, wherein, in response to a decision to modify the transmissions on the specified resources, the neighboring AP allocates available transmission power between the specified resources and the other resources used by the neighboring AP based on the request; and
means for transmitting, directly to the serving AP from the neighboring AP, a response to the request to indicate the decision to the serving AP.

22. The apparatus of claim 21, wherein the specified resources comprise at least one of a particular frequency sub-band, a group of sub-bands, a particular time slot, or a group of time slots.

23. The apparatus of claim 21, wherein the request is received from the serving AP via a backhaul network.

24. The apparatus of claim 23, wherein the response to the request is transmitted from the neighboring AP to the serving AP over the backhaul network.

25. The apparatus of claim 21, wherein the request is sent to the neighboring AP over the air (OTA), via the served AT.

26. The apparatus of claim 21, wherein the request is for the neighboring AP to at least one of refrain from transmitting or reduce power for transmissions on the specified resources.

27. An apparatus, comprising:
at least one processor configured to receive a request, from a serving access point (AP), for a neighboring AP of the apparatus to modify transmissions on specified resources, decide whether or not to modify the transmissions on the specified resources in accordance with the request, and transmit, directly to the serving AP from the neighboring AP, a response to the request to indicate the decision to the serving AP, wherein the specified resources include resources on which transmissions by the neighboring AP cause interference for the serving AP, wherein the request comprises a priority level associated with the specified resources on which the neighboring AP's transmission potentially interfere with the transmissions between the serving AP and a served access terminal (AT), and wherein, in response to a decision to modify the transmissions on the specified resources, the neighboring AP allocates available transmission power between the specified resources and the other resources used by the neighboring AP based on the request; and a memory coupled with the at least one processor.

28. A computer program product for managing interference by a neighboring access point (AP), comprising a non-transitory computer-readable medium having stored thereon:
code for receiving a request, from a serving access point (AP), for the neighboring AP to modify transmissions on specified resources, wherein the specified resources include resources on which transmissions by the neighboring AP cause interference for the serving AP, and wherein the request comprises a priority level associated with the specified resources on which the neighboring AP's transmission potentially interfere with transmissions between the serving AP and a served access terminal (AT);
code for deciding whether or not to modify the transmissions on the specified resources in accordance with the request, wherein, in response to a decision to modify the transmissions on the specified resources, the neighboring AP allocates available transmission power between the specified resources and the other resources used by the neighboring AP based on the request; and
code for transmitting, directly to the serving AP from the neighboring AP, a response to the request to indicate the decision to the serving AP.

29. A method of managing interference by an access terminal (AT), comprising:
receiving, by the AT, a request, from a serving access point (AP), for a neighboring AP to modify transmissions on specified resources, wherein the specified resources include resources on which transmissions by the neighboring AP cause interference on transmissions between the AT and the serving AP, and wherein the request comprises a priority level associated with the specified resources on which the neighboring AP's transmission potentially interfere with transmissions between the serving AP and the AT wherein resources used by the neighboring AP include:
the specified resources on which the transmissions by the neighboring AP cause interference for the serving AP, and
include other resources on which transmissions by the neighboring AP do not cause interference for the serving AP; and forwarding, by the AT, the request to the neighboring AP.

30. The method of claim 29, further comprising:
measuring signal strength of a pilot signal transmitted by the neighboring AP in response to the request.

31. The method of claim 29, further comprising:
calculating an expected signal to noise ratio (SNR) based on the pilot signal; and
transmitting the expected SNR to the serving AP.

32. An apparatus, comprising:

means for receiving a request, from a serving access point (AP) that serves the apparatus, for a neighboring AP to modify transmissions on specified resources, wherein the specified resources include resources on which transmissions by the neighboring AP cause interference on transmissions between an access terminal (AT) and the serving AP, and wherein the request comprises a priority level associated with the specified resources on which the neighboring AP's transmission potentially interfere with transmissions between the serving AP and the AT; and means for forwarding the request to the neighboring AP.

33. The apparatus of claim 29, further comprising:

means for measuring signal strength of a pilot signal transmitted by the neighboring AP in response to the request.

34. The apparatus of claim 29, further comprising:

means for calculating an expected signal to noise ratio (SNR) based on the pilot signal; and means for transmitting the expected SNR to the serving AP.

35. An apparatus, comprising:

at least one processor configured to receive a request, from a serving access point (AP) that serves the apparatus, for a neighboring AP to modify transmissions on specified resources and forward the request to the neighboring AP, wherein the specified resources include resources on which transmissions by the neighboring AP cause interference on transmissions between an access terminal (AT) and the serving AP, and wherein the request comprises a priority level associated with the specified resources on which the neighboring AP's transmission potentially interfere with transmissions between the serving AP and the AT; and a memory coupled with the at least one processor.

36. A computer program product for managing interference by an access terminal, comprising a non-transitory computer-readable medium having stored thereon:

code for receiving a request, from a serving access point (AP), for a neighboring AP to modify transmissions on specified resources, wherein the specified resources include resources on which transmissions by the neighboring AP cause interference on transmissions between an access terminal (AT) and the serving AP, and wherein the request comprises a priority level associated with the specified resources on which the neighboring AP's transmission potentially interfere with transmissions between the serving AP and the AT; and code for forwarding the request to the neighboring AP.

\* \* \* \* \*